(12) United States Patent
Kamiya et al.

(10) Patent No.: US 10,261,466 B2
(45) Date of Patent: Apr. 16, 2019

(54) ASSEMBLY REMOVABLE STRUCTURE AND IMAGE FORMING APPARATUS

(71) Applicant: FUJI XEROX CO.,LTD., Tokyo (JP)

(72) Inventors: Shogo Kamiya, Kanagawa (JP); Masakatsu Eda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/949,076

(22) Filed: Apr. 10, 2018

(65) Prior Publication Data

US 2018/0373196 A1    Dec. 27, 2018

(30) Foreign Application Priority Data

Jun. 27, 2017 (JP) ................. 2017-125207

(51) Int. Cl.
| | |
|---|---|
| *G03G 15/00* | (2006.01) |
| *G03G 21/16* | (2006.01) |
| *G03G 15/20* | (2006.01) |
| *H04N 1/00* | (2006.01) |

(52) U.S. Cl.
CPC ..... *G03G 21/1685* (2013.01); *G03G 15/2064* (2013.01); *G03G 15/80* (2013.01); *G03G 2221/1639* (2013.01); *H04N 1/00907* (2013.01)

(58) Field of Classification Search
CPC ................................ G03G 21/1685

USPC ......................................................... 399/122
See application file for complete search history.

(56) References Cited

U.S. PATENT DOCUMENTS

2018/0356764 A1* 12/2018 Kamiya ................. G03G 15/20

FOREIGN PATENT DOCUMENTS

JP         H11126009          5/1999

* cited by examiner

*Primary Examiner* — Walter L Lindsay, Jr.
*Assistant Examiner* — Philipmarcus T Fadul
(74) *Attorney, Agent, or Firm* — JCIPRNET

(57) ABSTRACT

An assembly removable structure includes an assembly including a connectable member and attached to and removed from a receiving member of an apparatus body in a first direction, a connection member disposed on the apparatus body to be movable forward and backward in a cross direction that crosses the first direction, a switch member operated independently of a lid member and switching the connection member between a first position and a second position, the lid member rendering the receiving member open and closed, a restricting member that moves with an operation from a restriction position, at which the restricting member restricts the assembly from being removed from the receiving member, to a release position, at which the restricting member releases the assembly, and a blocking device restricting an operation of moving the restricting member to the release position when the switch member is switched to the first position.

8 Claims, 15 Drawing Sheets

ASSEMBLY REMOVABLE STRUCTURE AND IMAGE FORMING APPARATUS

CROSS-REFERENCE TO RELATED APPLICATIONS

This application is based on and claims priority under 35 USC 119 from Japanese Patent Application No. 2017-125207 filed Jun. 27, 2017.

BACKGROUND

Technical Field

The present invention relates to an assembly removable structure and an image forming apparatus.

SUMMARY

According to an aspect of the invention, an assembly removable structure includes an assembly that includes a connectable member and that is attached to and removed from a receiving member of an apparatus body in a first direction, a connection member disposed on the apparatus body to be movable forward and backward in a cross direction that crosses the first direction, the connection member allowing the connectable member to be connected thereto while being in a projecting state, a switch member that is operated independently of a lid member and that switches the connection member between a first position, in which the connection member allows the connectable member to be connected thereto, and a second position, in which the connection member allows the connectable member to be removed therefrom, the lid member rendering the receiving member open and closed, a restricting member that moves with an operation from a restriction position, at which the restricting member restricts the assembly from being removed from the receiving member, to a release position, at which the restricting member releases the assembly, and a blocking device that restricts an operation of moving the restricting member to the release position when the switch member is switched to the first position.

BRIEF DESCRIPTION OF THE DRAWINGS

Exemplary embodiments of the present invention will be described in detail based on the following figures, wherein.

DETAILED DESCRIPTION

First Exemplary Embodiment

An assembly removable structure and an image forming apparatus according to the present exemplary embodiment are described as examples.

Entire Structure

Figure 1:
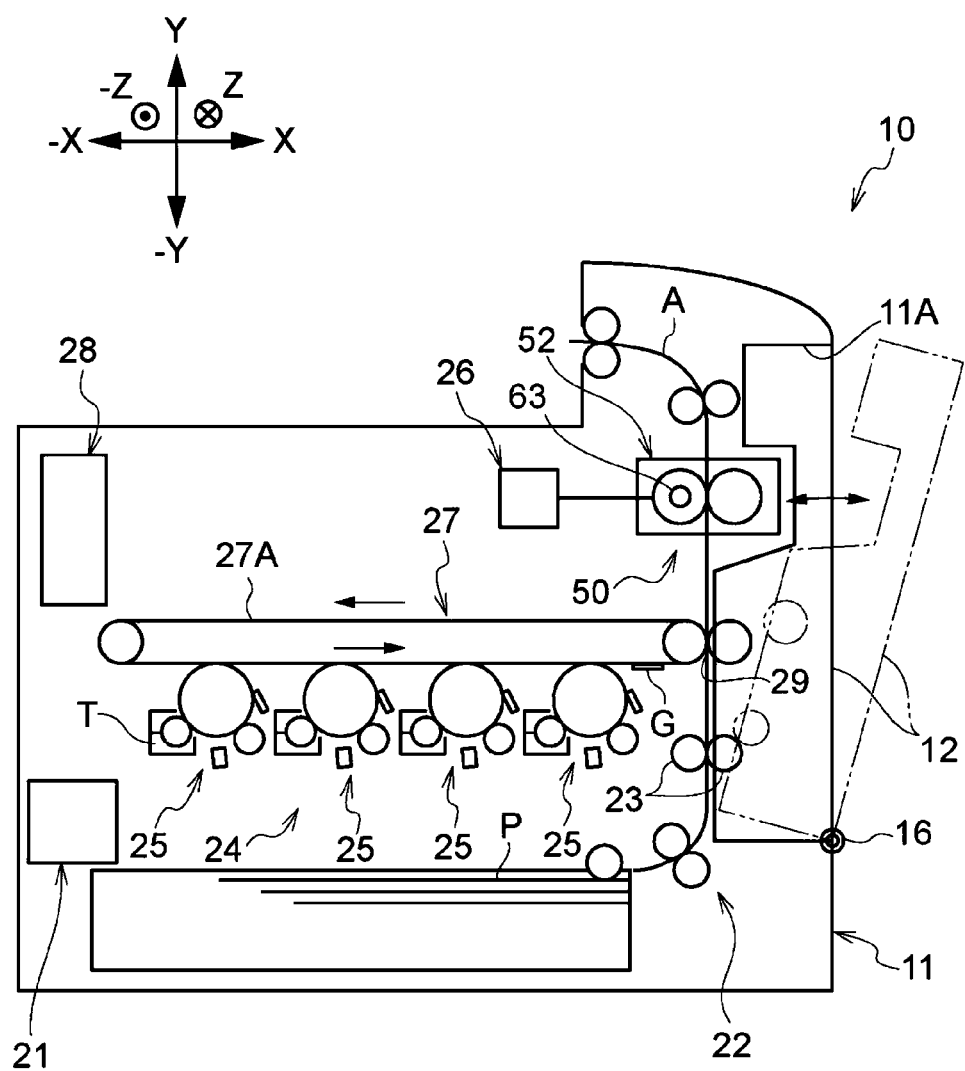
FIG. 1 illustrates an image forming apparatus according to a first exemplary embodiment.

FIG. 1 illustrates an image forming apparatus 10 according to the first exemplary embodiment. In the following description, the direction indicated with arrow Y in FIG. 1 refers to an apparatus height direction, and the direction indicated with arrow X in FIG. 1 refers to an apparatus width direction. The direction (indicated with Z) perpendicular to the apparatus height direction and the apparatus width direction in FIG. 1 refers to an apparatus depth direction. When the image forming apparatus 10 is viewed from the front, the apparatus height direction, the apparatus width direction, and the apparatus depth direction are respectively referred to as a Y direction, a X direction, and a Z direction. When each of the X direction, the Y direction, and the Z direction needs to have its one and the opposite sides distinguished from each other, the upper side is referred to as a Y side, the lower side is referred to as a −Y side, the right side is referred to as an X side, the left side is referred to as a −X side, the rear side is referred to as a Z side, and the front side is referred to as a −Z side, when the image forming apparatus 10 is viewed from the front.

The image forming apparatus 10 includes a box-shaped apparatus body 11. The apparatus body 11 houses a receiving member 13 (see FIG. 3) to which a fixing unit 52, described below, is attached. The receiving member 13 is described in detail below. The apparatus body 11 has a cut in an X side portion. The cut portion is referred to as an opening 11A. A hinge 16, rotatable about its axis extending in the Z direction, is disposed on a −Y side end portion of the opening 11A. A covering 12, which is an example of a lid member, has its −Y side end portion attached to a movable portion of the hinge 16.

For example, the covering 12 has a U-shaped cross section when viewed in the Z direction and extends in the Y direction. The covering 12 is arcuately movable about the hinge 16 between a closed position, in which it closes the opening 11A, and an open position, in which it allows the opening 11A open. In the state where a fixing unit 52, described below, is attached to a receiving member 13, the covering 12 in the closed position covers a pair of positioning rollers 23, a second transfer portion 29, and the fixing unit 52, and the covering 12 in the open position allows the pair of positioning rollers 23, the second transfer portion 29, and the fixing unit 52 to be exposed from the apparatus body 11. The pair of positioning rollers 23 are described below. In other words, the covering 12 renders the receiving member 13 open and closed.

The image forming apparatus 10 includes a power supply 21, a transport portion 22, an image forming unit 24, a removable structure 50, which is an example of an assembly removable structure, a driver 26, and a controller 28. The transport portion 22 includes multiple rollers including the pair of positioning rollers 23 to transport sheets P along a transport path A. The sheets P are an example of a recording medium. The transport path A, for example, extends in the Y direction from a −Y side lower portion to a Y side upper portion of the apparatus body 11.

The image forming unit 24 is an example of a developer image forming device, and includes multiple image forming units 25 and a transfer unit 27. The image forming unit 24 forms toner images G using toner T on a sheet P transported by the transport portion 22. The toner T is an example of a developer. The toner images G are an example of an image and a developer image. The multiple image forming units 25 perform, for example, charging, exposure, and development operations in the known electrophotographic system.

The transfer unit 27 includes an intermediate transfer belt 27A to which toner images G are first-transferred and which second-transfers the first-transferred toner images G onto the sheets P at the second transfer portion 29 on the transport path A. The controller 28 controls operations such as power supply from the power supply 21 to each component of the image forming apparatus 10, transportation of the sheets P performed by the transport portion 22, an image forming operation of the image forming unit 24, and an operation of the driver 26.

Driver

The driver 26 includes a motor, which is not illustrated and rotates a coupling member 54 (see FIG. 3) described below. The driver 26 has its driving operation controlled by the controller 28.

Receiving Member

Figure 3:
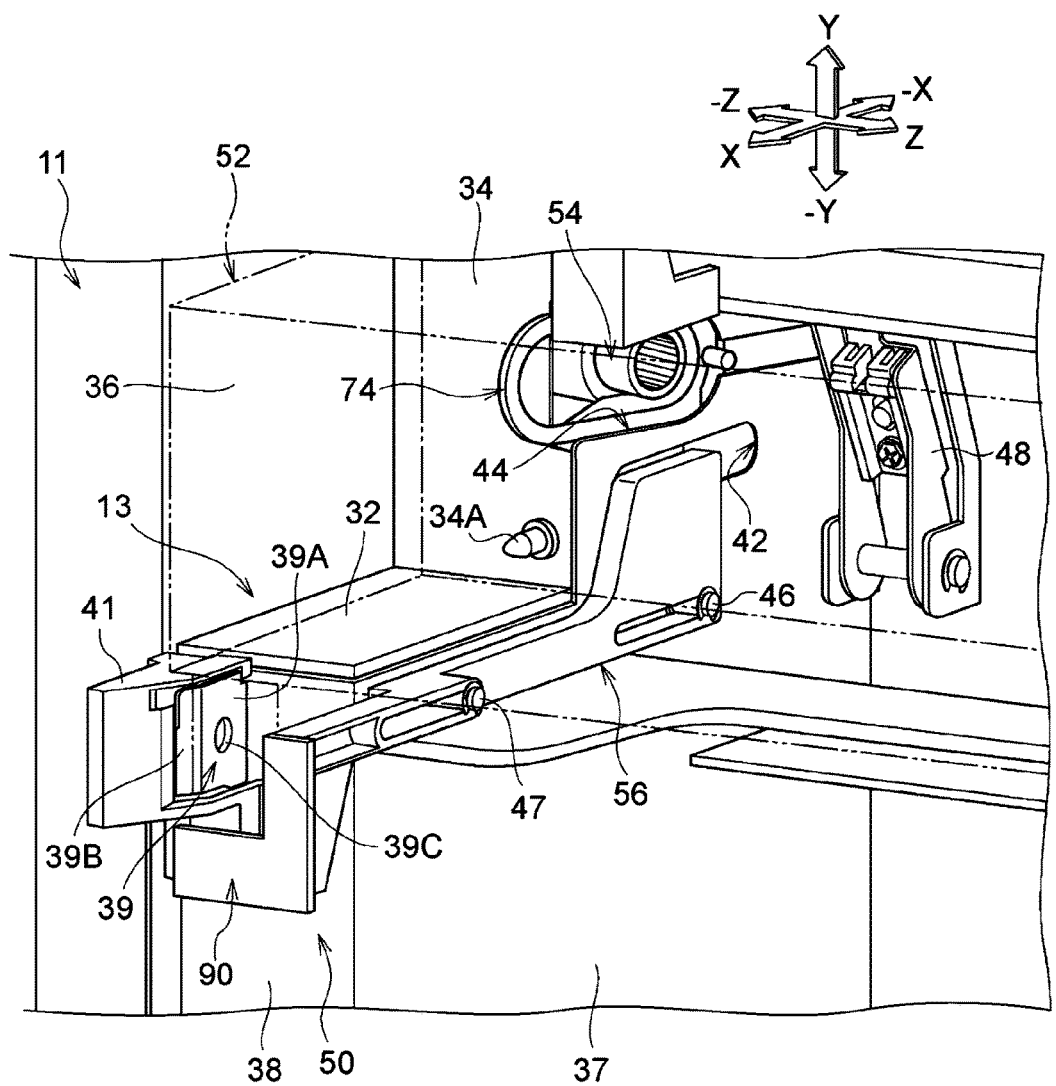
FIG. 3 is a perspective view of an apparatus body and link member according to the first exemplary embodiment.

The receiving member 13 shown in FIG. 3 is disposed on the X side of the center of the apparatus body 11 in the X direction and on the Y side of the center of the apparatus body 11 in the Y direction. The receiving member 13 is open to the X side. The receiving members 13 on the −Z and Z sides are substantially symmetrical with respect to the center of the apparatus body 11 in the Z direction. Thus, FIG. 3 illustrates the receiving member 13 on the −Z side and omits the illustration of the receiving member 13 on the Z side. Each receiving member 13 includes, for example, a bottom wall 32, an inner wall 34, and a side wall 36.

The bottom wall 32 has a shape of a rectangle having its length in the X direction and its width in the Z direction. The inner wall 34 stands erect in the Y direction from the −X side end portion of the bottom wall 32. A stud 34A, extending toward the X side, is disposed on the inner wall 34. The side wall 36 stands erect in the Y direction from the −Z side end portion of the bottom wall 32.

A side plate 37 extending in the X-Y plane is disposed on the Z side of the Z side end portion of the bottom wall 32 and the Z side end portion of the inner wall 34. The side plate 37 includes a portion extending toward the −Y side from the Z side end portion of the bottom wall 32, and a portion extending toward the −X side from the Z side end portion of the inner wall 34. A front plate 38 extending in the Y-Z plane is disposed on the −Y side of the X side end portion of the bottom wall 32. The front plate 38 extends toward the −Y side from the X side end portion of the bottom wall 32. The side plate 37 and the front plate 38 are integrated together.

The side plate 37 has a hole 42 and a cut 44 at a portion on the −X side of the inner wall 34. The hole 42 extends through the side plate 37 in the Z direction. The hole 42 extends longer in the X direction than in the Y direction. The cut 44 is disposed on the Y side of the hole 42. For example, the cut 44 has a U shape that is open to the X side when viewed in the Z direction.

A support pin 46 and a support pin 47 are disposed on the side plate 37. For example, the support pins 46 and 47 have a cylindrical shape of the same size. The support pin 46 extends to the Z side from a portion on the −Y side of the hole 42 while having its axis extending in the Z direction. The support pin 47 extends to the Z side from a portion on the −Y side of the bottom wall 32 while having its axis extending in the Z direction. The support pins 46 and 47 have their attachment heights in the Y direction aligned with each other and are arranged in the X direction.

A bracket 39 and a bracket cover 41 are disposed on the front plate 38. The bracket 39 includes a wall 39A and an inclined wall 39B. The wall 39A is fixed to the front plate 38 with a screw not illustrated and extends from the front plate 38 toward the X side. The inclined wall 39B extends obliquely from an X side end portion of the wall 39A to have its X side portion disposed on the −Z side (outer side) of the −X side portion. The wall 39A has a through hole 39C, which extends through in the Z direction. When the through hole 39C receives a shaft 82 (see FIG. 4) described below, the bracket 39 restricts movement of the shaft 82 in the X direction. The bracket cover 41 covers the −Z side of the bracket 39 while allowing the through hole 39C, a portion around the through hole 39C, and a portion of the inclined wall 39B of the bracket 39 to be exposed to the Z side.

For example, a pressing member 48, which presses the fixing unit 52 toward a removal side (X side), is disposed at a portion on the −X side of the receiving member 13 in the apparatus body 11.

Structure of Related Portion

The removable structure 50 is described now.

The removable structure 50 illustrated in FIG. 3 includes a fixing unit 52, a coupling member 54, a link member 56, an operation lever 58 (see FIG. 4), and a blocking portion 90. The fixing unit 52 is an example of an assembly. The coupling member 54 is an example of a connection member. The link member 56 is an example of a switch member. The operation lever 58 is an example of a restricting member. The blocking portion 90 is an example of a blocking device.

Fixing Unit

Figure 2A:
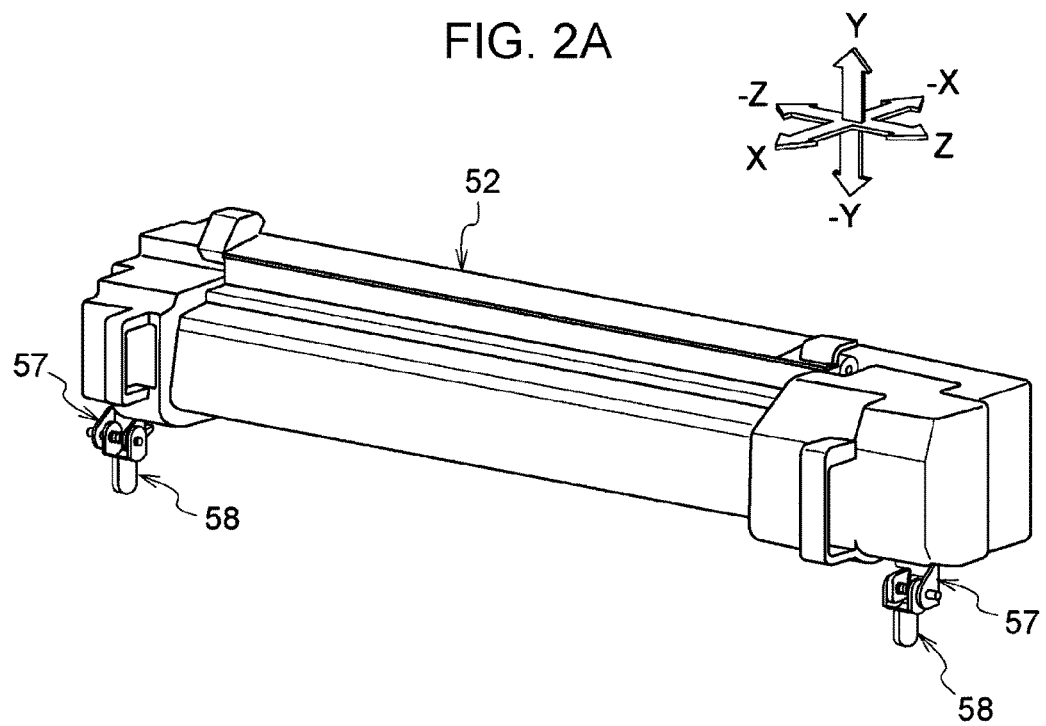
FIG. 2A is a perspective view of a fixing unit according to a first exemplary embodiment.
Figure 2B:
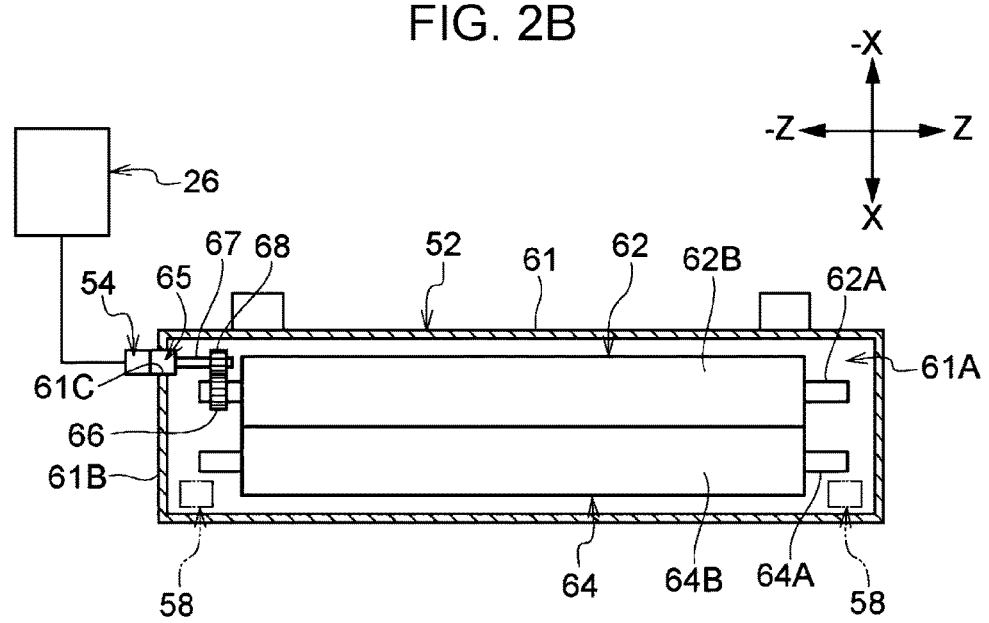
FIG. 2B illustrates an internal structure of the fixing unit according to the first exemplary embodiment.

The fixing unit 52 illustrated in FIG. 2B includes a housing 61, a fixing roller 62, which is an example of a rotator, a halogen heater 63 (see FIG. 1), a pressing roller 64, and a coupling member 65, which is an example of a connectable member. The fixing unit 52 is longer in the Z direction than in the X direction.

The housing 61 has a rectangular parallelepiped box shape extending in the Z direction. The housing 61 includes a bottom portion 61A, extending longer in the Z direction than in the X direction when viewed in the Y direction, and a side portion 61B, standing erect in the Y direction at the −Z side end portion of the bottom portion 61A. The side portion 61B has a through hole 61C, which extends through in the Z direction.

Figure 4:
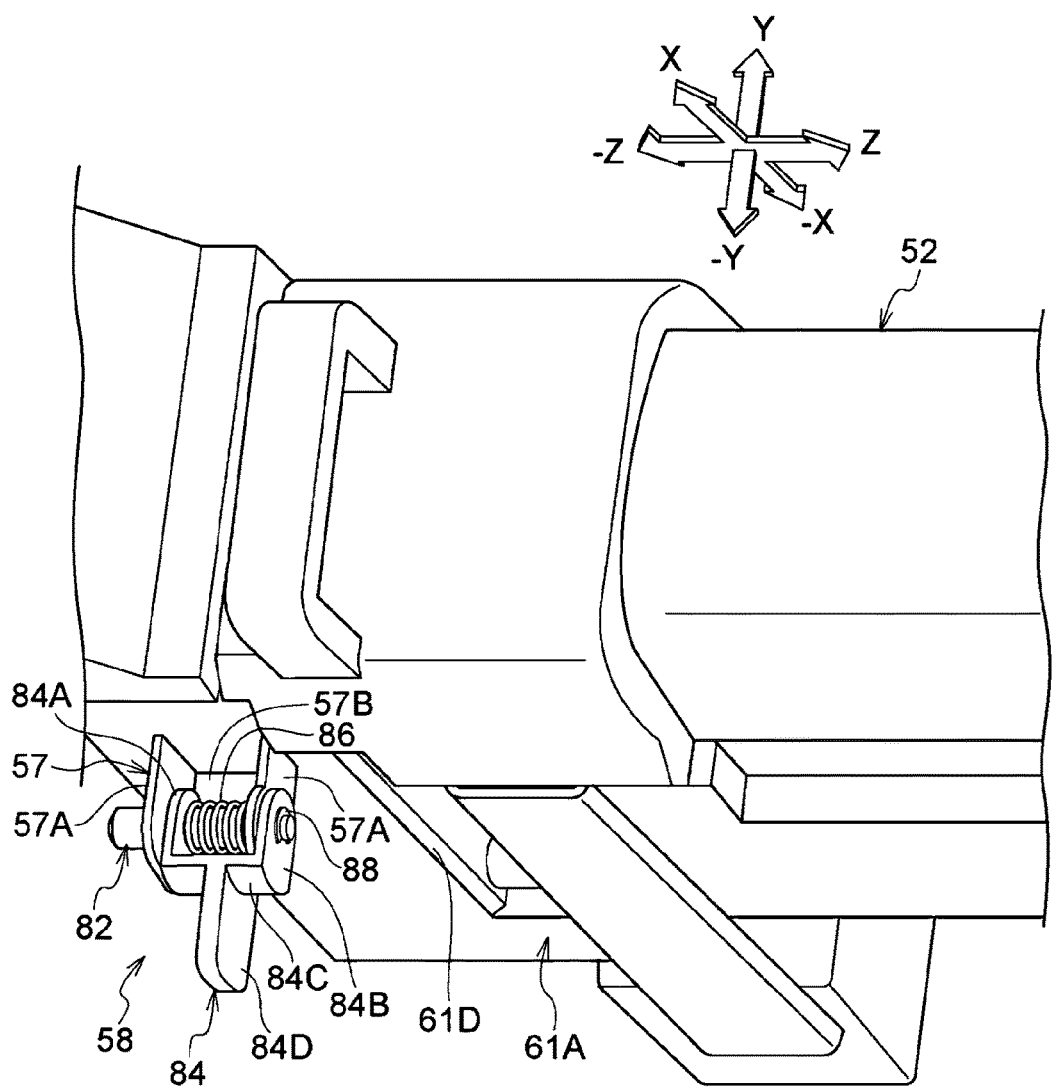
FIG. 4 is a perspective view of the bottom of the fixing unit according to the first exemplary embodiment.

The bottom portion 61A illustrated in FIG. 4 has recesses 61D, set back to the Y side, on both end portions of the bottom portion 61A in the Z direction. Brackets 57 are disposed on the outer sides, in the Z direction, of the recesses 61D of the bottom portion 61A. Each bracket 57 includes two side plates 57A, opposing in the Z direction, and a side plate 57B, connecting the −X side end portions of the two side plates 57A. Specifically, when viewed in the Y direction, each bracket 57 has a U-shaped cross section that is open to the X side. Although not illustrated, each of the two side plates 57A has a through hole that extends through in the Z direction.

As illustrated in FIG. 2A, the two brackets 57 respectively support the operation levers 58. The operation levers 58 are described in detail below.

The fixing roller 62 illustrated in FIG. 2B includes, for example, a cylindrical core bar 62A and a coating portion 62B on the outer circumferential surface of the cylindrical core bar 62A. The coating portion 62B includes an elastic layer and a release layer. The fixing roller 62 is disposed on the −X side of the transport path A (see FIG. 1) in the housing 61 to be rotatable about the axis extending in the Z direction. A halogen heater 63 (see FIG. 1) is disposed in the core bar 62A so as not to come into contact with the core bar 62A.

The halogen heater 63 generates heat with energization to heat the fixing roller 62. A gear 66 is attached to the core bar 62A on the outer circumference of the −Z side end portion. The fixing roller 62 has its temperature detected by a temperature sensor, not illustrated. When the temperature sensor detects a temperature lower than a predetermined temperature, the halogen heater 63 is energized. When the temperature sensor detects a temperature higher than or equal to the predetermined temperature, the halogen heater 63 is stopped being energized.

For example, the pressing roller 64 includes a cylindrical core bar 64A and a coating portion 64B on the outer circumferential surface of the cylindrical core bar 64A. The coating portion 64B includes an elastic layer and a release layer. The pressing roller 64 is disposed in the housing 61 on the X side of the transport path A (see FIG. 1) to be rotatable about the axis extending in the Z direction. The pressing roller 64 is movable by a retract mechanism, not illustrated and including a spring, between a pressing position, at which it presses the fixing roller 62, and a retract position, at which it is spaced from the fixing roller 62. The pressing roller 64 forms a nip while having its outer circumferential surface pressing the outer circumferential surface of the fixing roller 62.

The coupling member 65 is cylindrical and disposed in the housing 61 to be rotatable about the axis extending in the Z direction relative to the side portion 61B. The coupling member 65 includes multiple protrusions, not illustrated, at intervals in the circumferential direction on the outer circumferential surface of the coupling member 65 at a portion coupled with the coupling member 54. The coupling member 65 has its −Z side end portion exposed to the outside of the housing 61 through the through hole 61C. A rotation shaft 67 is attached to the Z side end portion of the coupling member 65.

A gear 68 is attached to the rotation shaft 67. The gear 68 is engaged with the gear 66. Thus, the fixing roller 62 is rotated when the coupling member 54 is rotated. The fixing roller 62 is thus rotated by the rotational force transmitted from the driver 26 via the coupling member 54 and the coupling member 65, described below, and fixes the toner image G (see FIG. 1) to the sheet P.

The fixing unit 52 illustrated in FIG. 3 is attached to the receiving member 13 from the X side to the −X side in the X direction and removed toward the X side. In the present exemplary embodiment, an example of a first direction is the X direction, and an example of a cross direction is the Z direction.

Coupling Member

Figure 6:
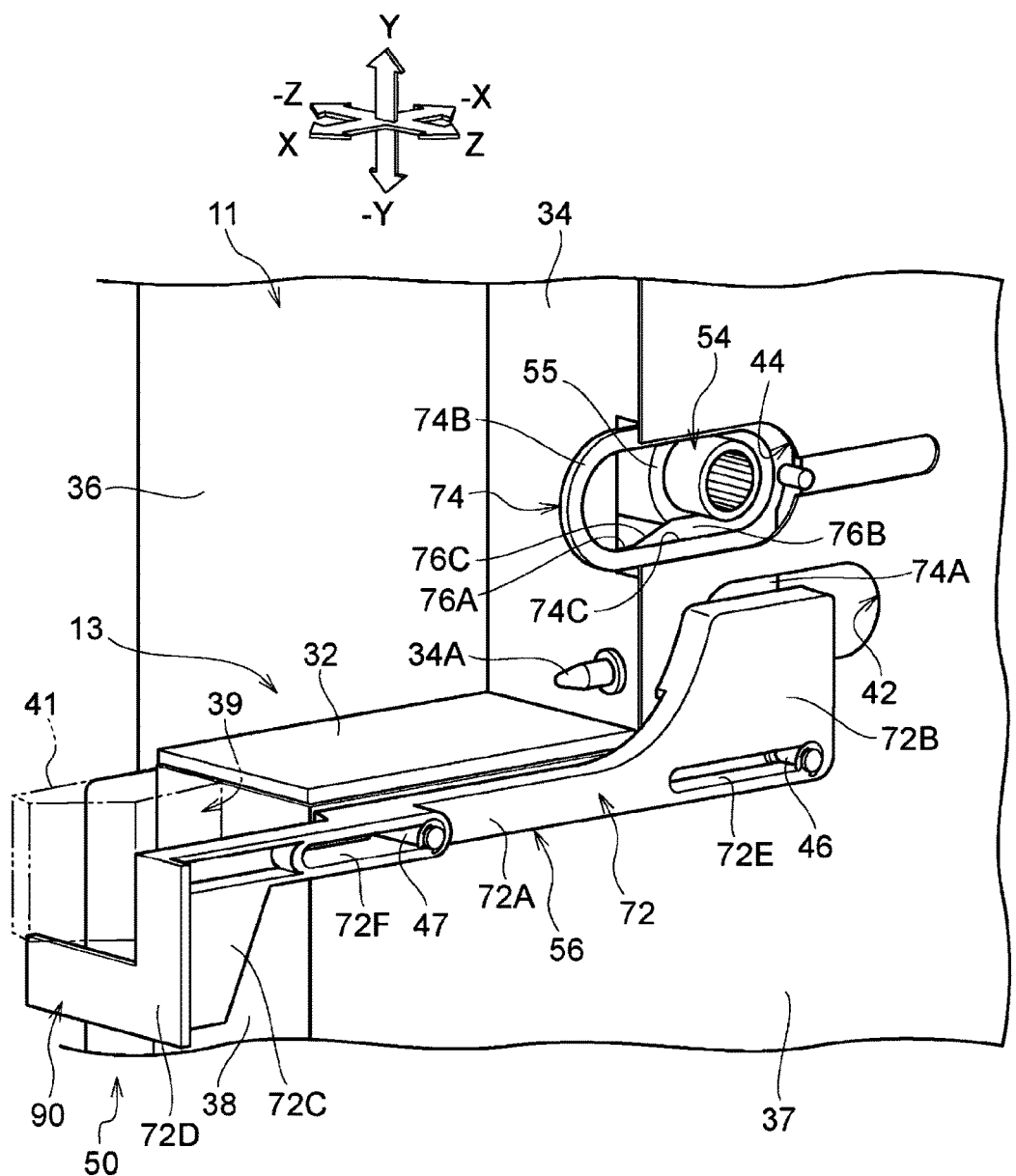
FIG. 6 illustrates a link member according to the first exemplary embodiment in a second position and a coupling member in a retracted state.

The coupling member 54 illustrated in FIG. 6 has, for example, a cylindrical shape having its axis extending in the Z direction. The coupling member 54 has an annular contact surface 55 when viewed from the Z side in the Z direction. The coupling member 54 is rotatable in the apparatus body 11 about the axis extending in the Z direction. The coupling member 54 is capable of moving to the Z side of the side plate 37 in the Z direction and moving away to the −Z side of the side plate 37 in the Z direction through the cut 44 of the apparatus body 11. The coupling member 54 is pressed to the Z side by a coil spring, not illustrated.

The coupling member 54 has multiple recesses, not illustrated and spaced at intervals in the circumferential direction. These recesses are engaged with protrusions, not illustrated, of the coupling member 65 (see FIG. 2B) when the coupling member 54 changes its relative position in the Z direction. Specifically, the coupling member 54 is connected to the coupling member 65 when moved forward. The coupling member 54 transmits the rotational force to the coupling member 65 when driven to rotate by the driver 26 (see FIG. 2B).

Link Member

The link member 56 illustrated in FIG. 6 includes, for example, a first link member 72, disposed on the Z side of the side plate 37, and a second link member 74, disposed on the −Z side of the side plate 37 and fixed to the first link member 72.

The first link member 72 includes, for example, a lengthwise portion 72A, an upright portion 72B, a sag portion 72C, and a front plate portion 72D. The lengthwise portion 72A is an angular prism longer in the X direction than in the Z direction. The lengthwise portion 72A has a long hole 72E, extending in the X direction, at a −X side portion. The lengthwise portion 72A has a long hole 72F, extending in the X direction, at an X side portion. The long hole 72E receives the support pin 46. The long hole 72F receives the support pin 47. Thus, the first link member 72 is supported and guided in the X direction by the support pins 46 and 47.

The upright portion 72B stands erect to the Y side at the −X side portion of the lengthwise portion 72A. The upright portion 72B faces the hole 42 of the side plate 37 in the Z direction while the lengthwise portion 72A is supported by the support pins 46 and 47. The sag portion 72C is a portion sagging to the −Y side at the X side portion of the lengthwise portion 72A. The front plate portion 72D is a plate member extending to the Z side from the X side end portions of the lengthwise portion 72A and the sag portion 72C. When the front plate portion 72D is viewed in the X direction, the front plate portion 72D has a rectangular contour having its length in the Y direction and its width in the Z direction. The blocking portion 90 extending to the −Z side is disposed on a −Y side portion of the center of the front plate portion 72D in the Y direction. The blocking portion 90 is described in detail, below.

The second link member 74 includes, for example, a leg 74A and a cam 74B. The leg 74A is fixed to the upright portion 72B through the hole 42 and extends in the Y direction. The cam 74B extends from the Y side end portion (upper end portion) of the leg 74A to the X side in the X direction. The cam 74B has a long hole 74C extending through the cam 74B in the Z direction and extending in the X direction.

The long hole 74C has a size appropriate for the distance by which the link member 56 needs to move for the coupling member 54 to move forward in the Z direction. Specifically, the long hole 74C has a dimension in the X direction that is greater than or equal to twice the dimension (diameter) of the coupling member 54 in the X direction and greater than the distance in the X direction from a second position to a first position of the link member 56. The first position and the second position are described below.

At the −Z side edge of the long hole 74C in the cam 74B, a flat portion 76A extending in the X direction is disposed on the X side of the center in the X direction, and an overhanging portion 76B projecting to the −Z side is disposed on the −X side. The flat portion 76A and the overhanging portion 76B are connected together by an inclined portion 76C. While the overhanging portion 76B and the contact surface 55 of the coupling member 54 are in contact with each other, the coupling member 54 retracts away from the coupling member 65 (see FIG. 2B). The position of the link member 56 in the retracted state is referred to as the second position.

Figure 7:
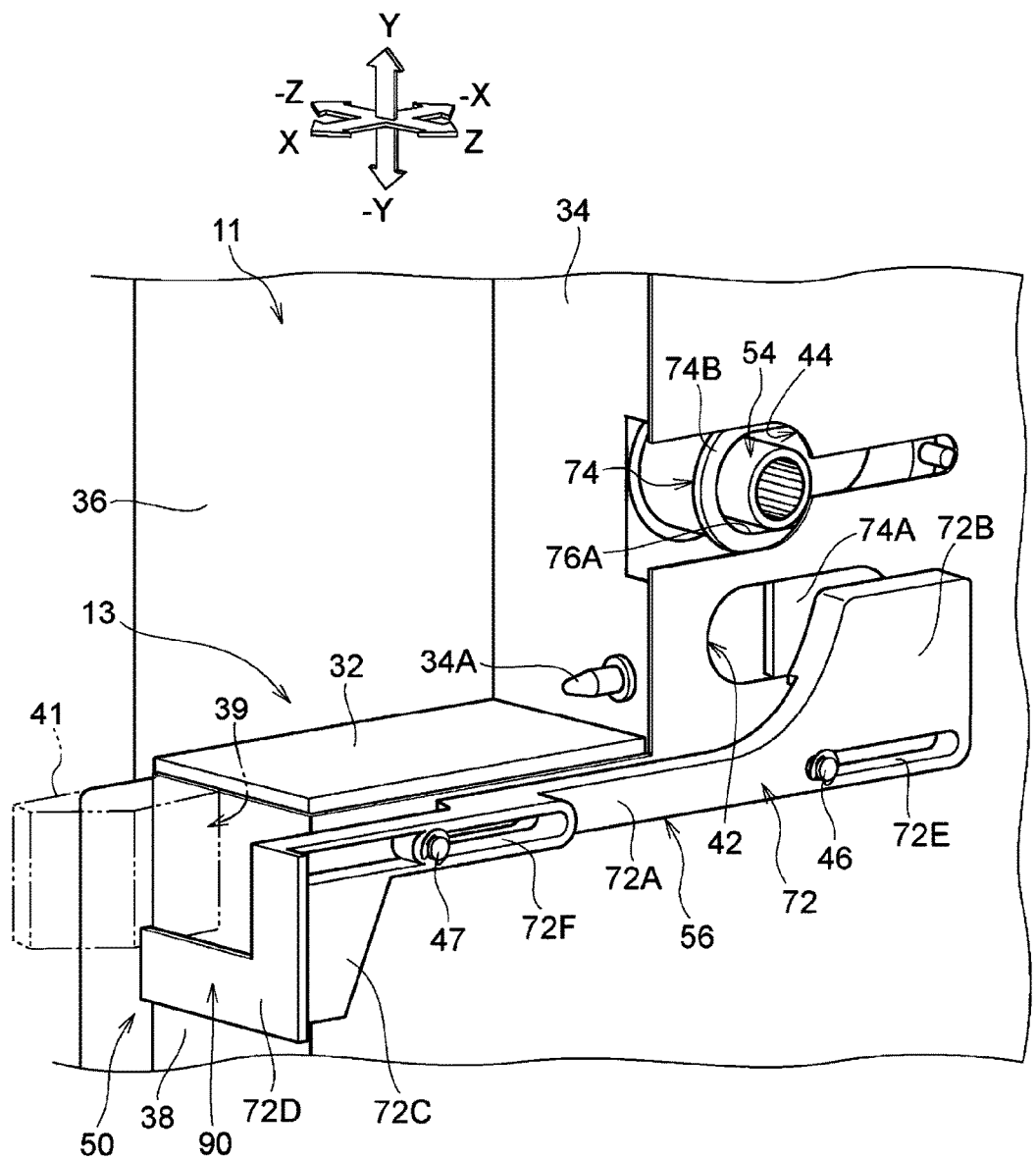
FIG. 7 illustrates the link member according to the first exemplary embodiment in a first position and a coupling member in a projecting state.

On the other hand, while the flat portion 76A and the contact surface 55 (see FIG. 6) are in contact with each other, as illustrated in FIG. 7, the coupling member 54 is in the projecting state, that is, connected to the coupling member 65 (see FIG. 2B). The position of the link member 56 in the projecting state is referred to as the first position. The first position is closer to the rear side (−X side) of the apparatus body 11 than the second position.

The link member 56 is switched between the first position and the second position by being moved in the X direction. The link member 56 is moved independently of the covering 12 (see FIG. 1). Moved independently here refers to the case where the link member 56 is not moved by the force for operating the covering 12 and that the covering 12 is not moved by an operation of the link member 56.

Operation Lever

Figure 5:
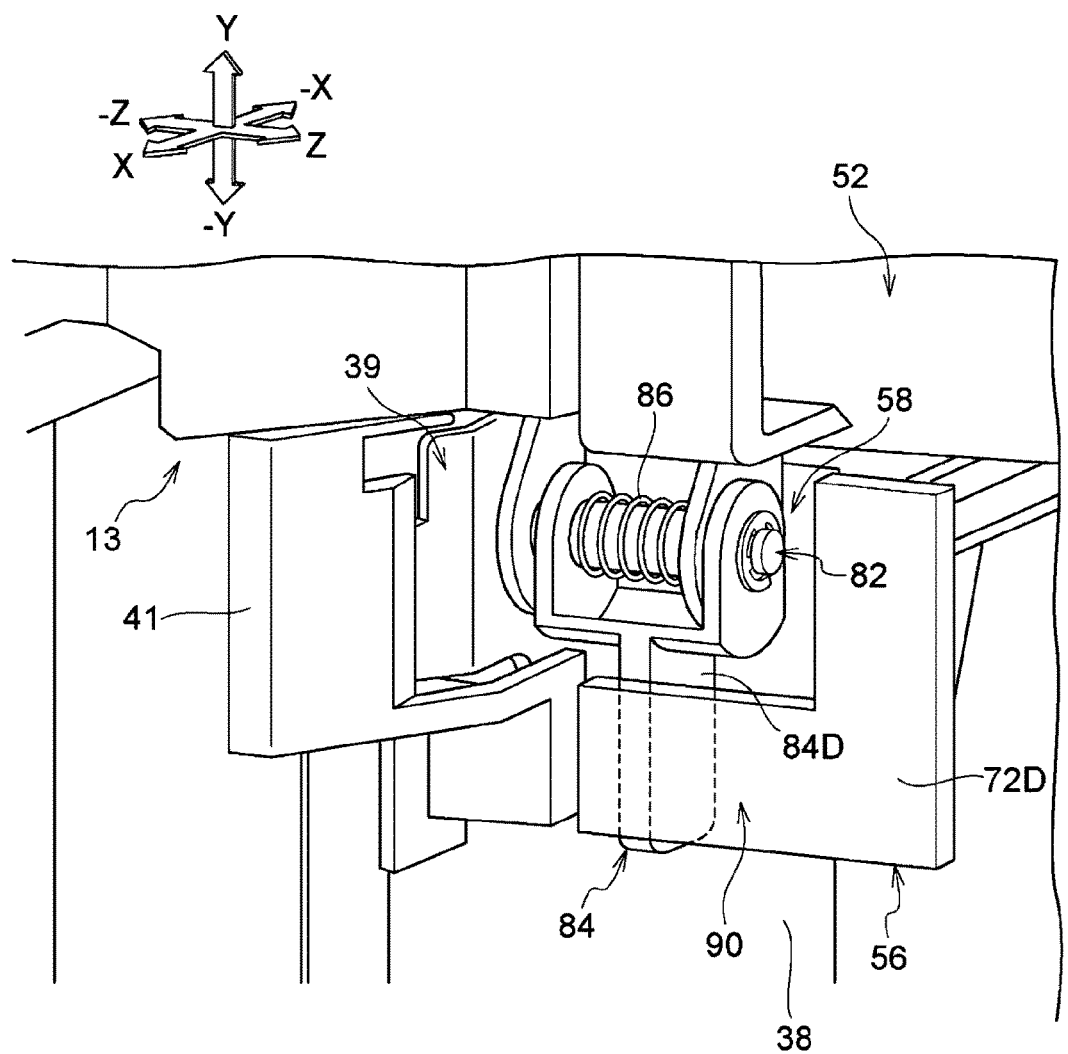
FIG. 5 illustrates a removable operation lever according to the first exemplary embodiment having its operation being restricted by a link member.

The operation lever 58 illustrated in FIG. 5 includes a shaft 82 and an operation portion 84. The operation lever 58 includes a coil spring 86. The operation lever 58 is disposed on the outer side (−Z side) of the link member 56 with respect to the center of the fixing unit 52 in the Z direction.

The shaft 82 illustrated in FIG. 4 has a cylindrical shape having its axis extending in the Z direction. The shaft 82 extends through through holes, not illustrated, of two side plates 57A of the bracket 57 to be supported by the bracket 57. Specifically, the shaft 82 is disposed on the fixing unit 52. The shaft 82 is supported by the two side plates 57A to be rotatable about the axis extending in the Z direction and movable in the Z direction. The shaft 82 is insertable into and removable from the through hole 39C (see FIG. 3) in the Z direction while the fixing unit 52 is attached to the receiving member 13 (see FIG. 3).

The operation portion 84 includes, for example, plate portions 84A and 84B, a bridge portion 84C, and a lever portion 84D. The plate portions 84A and 84B extend in the X-Y plane and face each other while being spaced apart from each other in the Z direction. The plate portion 84A is disposed on the −Z side, and the plate portion 84B is disposed on the Z side. The plate portion 84A is disposed on the Z side of the side plate 57A disposed on the −Z side. The plate portion 84B is disposed on the Z side of the side plate 57A disposed on the Z side. Although not illustrated, the plate portions 84A and 84B each have a through hole into which the shaft 82 is inserted and fixed while the shaft 82 has its axis extending in the Z direction.

The bridge portion 84C connects the Y side end portion of the plate portion 84A to the Y side end portion of the plate portion 84B in the Z direction. The lever portion 84D extends to the −Y side from the center of the bridge portion 84C in the Z direction. Thus, the operation portion 84 extends from the shaft 82 outward in the radial direction of the shaft 82 to move the shaft 82 in the Z direction and rotate the shaft 82 about the Z axis. The lever portion 84D is located to the −Y side of the shaft 82 due to its weight.

The coil spring 86 is held between the plate portion 84A and the side plate 57A on the Z side and contracts or expands in the Z direction. The shaft 82 is inserted into the coil spring 86, held between the plate portion 84A and the side plate 57A on the Z side, and the through holes of the side plate 57A and the plate portions 84A and 84B. The through holes are not illustrated. The shaft 82 having its −Z side end portion protruding to the −Z side beyond the side plate 57A is prevented from being removed from the bracket 57 and the operation portion 84 while allowing an E retainer ring 88 to be attached to the outer circumference of the Z side end portion.

Figure 8A:
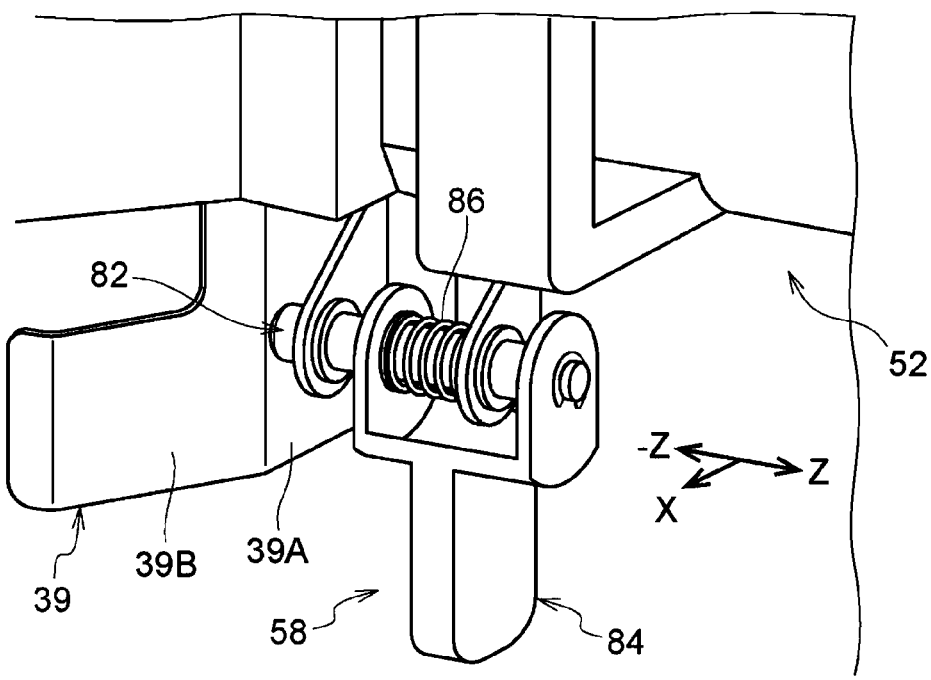
FIG. 8A illustrates the operation lever according to the first exemplary embodiment in the release state.
Figure 8B:
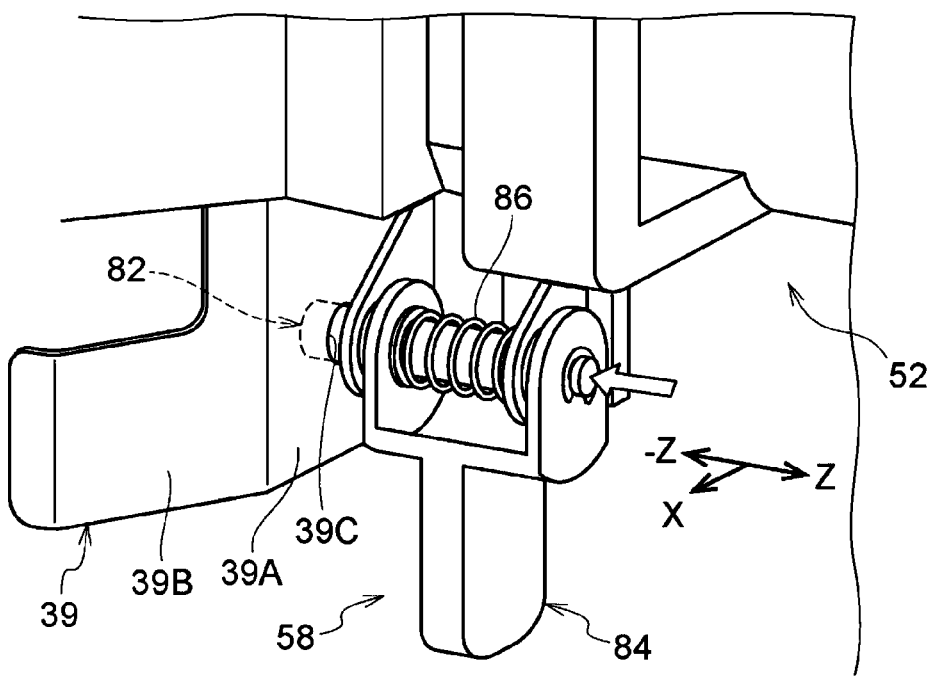
FIG. 8B illustrates the operation lever according to the first exemplary embodiment in a restricted state.

As illustrated in FIG. 8B, the shaft 82 has its −Z side end portion inserted into the through hole 39C while the fixing unit 52 is attached to the receiving member 13 (see FIG. 3), so that the fixing unit 52 is restricted from being removed from the receiving member 13. The position of the operation lever 58 at this time is referred to as a restriction position.

When the operation portion 84 of the operation lever 58 is operated to the Z side, on the other hand, the coil spring 86 contracts in the Z direction and the shaft 82 comes off the through hole 39C. Thus, the fixing unit 52 becomes no longer restricted from being removed from the receiving member 13 (see FIG. 3). The position of the operation lever 58 at which the shaft 82 comes off the through hole 39C is referred to as a release position. As described above, the operation lever 58 moves between the restriction position and the release position with the operation of the operation portion 84. FIG. 8A illustrates the operation lever 58 displaced from the release position to the X side.

Blocking Portion

The blocking portion 90 illustrated in FIG. 5 is disposed, for example, on the link member 56. Specifically, the blocking portion 90 has a shape of a plate having a thickness in the X direction and extending to the −Z side from the −Y side portion of the front plate portion 72D. The blocking portion 90 is disposed on the X side of the operation lever 58 while the fixing unit 52 is attached to the receiving member 13.

The dimension of the blocking portion 90 in the Z direction is determined to have its part overlap the Y-direction center of the lever portion 84D in the Z direction when the fixing unit 52 is attached to the receiving member 13 and when the blocking portion 90 is viewed in the X direction. Specifically, when the link member 56 is switched to the first position, the blocking portion 90 blocks the operation path of the operation lever 58 to restrict the operation of the operation lever 58 to the release position.

The operation path according to the present exemplary embodiment refers to the path along which the operator's finger, not illustrated, travels until reaching the operation portion 84. Blocking the operation path according to the present exemplary embodiment refers to disposing a component constituting the blocking portion 90 to the X side (closer to the operator, not illustrated) of the operation portion 84. In other words, blocking the operation path refers to disabling an operator, not illustrated, from operating the operation lever 58 from the restriction position to the release position. In the present exemplary embodiment, the interval between the operation portion 84 and the blocking portion 90 in the X direction and the interval between the operation portion 84 and the front plate 38 are determined to be appropriate for disabling an operation of the operation lever 58 from the restriction position to the release position while the blocking portion 90 is blocking the operation path of the operation lever 58. Thus, while the blocking portion 90 is blocking the operation path of the operation lever 58, the operator is unable to hold the operation portion 84 from the X side and to operate the operation portion 84 from the −Y side.

Operation

The operation according to the first exemplary embodiment is described now.

As illustrated in FIG. 3, in the removable structure 50, the fixing unit 52 is attached to the receiving member 13 when the link member 56 is in the second position. As illustrated in FIG. 8A, the shaft 82 of the operation lever 58 moves to the Z side when coming into contact with the inclined wall 39B and the wall 39A of the bracket 39. The operation lever 58 receives a pressing force from the coil spring 86 toward the −Z side. As illustrated in FIG. 8B, when aligned with the through hole 39C in the Z direction, the shaft 82 enters the through hole 39C and comes into contact with the bracket 39. Thus, the fixing unit 52 is prevented from being removed. FIGS. 8A and 8B omit the illustration of the bracket cover 41 (see FIG. 3).

Subsequently, the link member 56 illustrated in FIG. 3 is operated (switched) from the second position to the first position, and the coupling member 54 is connected to the coupling member 65 (see FIG. 2B). Connection of the coupling member 54 to the coupling member 65 is not linked with opening or closing of the covering 12 (see FIG. 1). Thus, the coupling member 54 is not connected to or disconnected from the coupling member 65 in response to opening or closing of the covering 12 after, for example, jamming of the transport path A (see FIG. 1) with a sheet P. This structure reduces degradation (wearing caused by engagement of protrusions and recesses) of the coupling member 54 further than the structure in which the connection of the coupling member 54 is linked with opening or closing of the covering 12.

As illustrated in FIG. 5, when the link member 56 is switched to the first position, the blocking portion 90 is disposed on the X side of the operation lever 58. Here, the blocking portion 90 prevents an operator, not illustrated, from moving the operation lever 58. Thus, the fixing unit 52 is prevented from being removed from the receiving member 13 while the coupling members 54 and 65 (see FIG. 2B) are connected together. This structure reduces degradation (deformation such as having the shaft bent) of the coupling member 54 further than the structure in which the operation lever 58 is operable while the coupling members 54 and 65 are connected together.

In the removable structure 50, the blocking portion 90 blocks the operation path of the operation lever 58 to restrict the operation of the operation lever 58. This structure renders the operation lever 58 less recognizable by an operator. This structure thus prevents the operation lever 58 from being mishandled unlike the structure that enables the operation lever 58 to be operated to the release position while the coupling members 54 and 65 are connected together.

In the removable structure 50, the blocking portion 90 is disposed on the link member 56. This structure eliminates the need for a mechanism for moving the blocking portion 90 separately from the link member 56. The blocking portion 90 thus has a simpler structure in this structure than in the structure where the blocking portion 90 and the link member 56 are separately disposed.

In the image forming apparatus 10 illustrated in FIG. 1, the rotational force caused in the driver 26 is transmitted to the fixing roller 62 (see FIG. 2B) via the coupling members 54 and 65 (see FIG. 2B). In the removable structure 50, the coupling members 54 and 65 are prevented from being degraded. This structure thus further reduces variation of the rotation transmitted to the fixing roller 62 than the structure not including the removable structure 50. This structure thus prevents the fixed toner from being displaced from a predetermined fixed position on the sheet P and reduces defects of the toner image G.

Second Exemplary Embodiment

An assembly removable structure and an image forming apparatus according to a second exemplary embodiment are described now as examples. Components or portions basically the same as those of the first exemplary embodiment are denoted with the reference signs the same as those of the first exemplary embodiment and not described.

Figure 9:
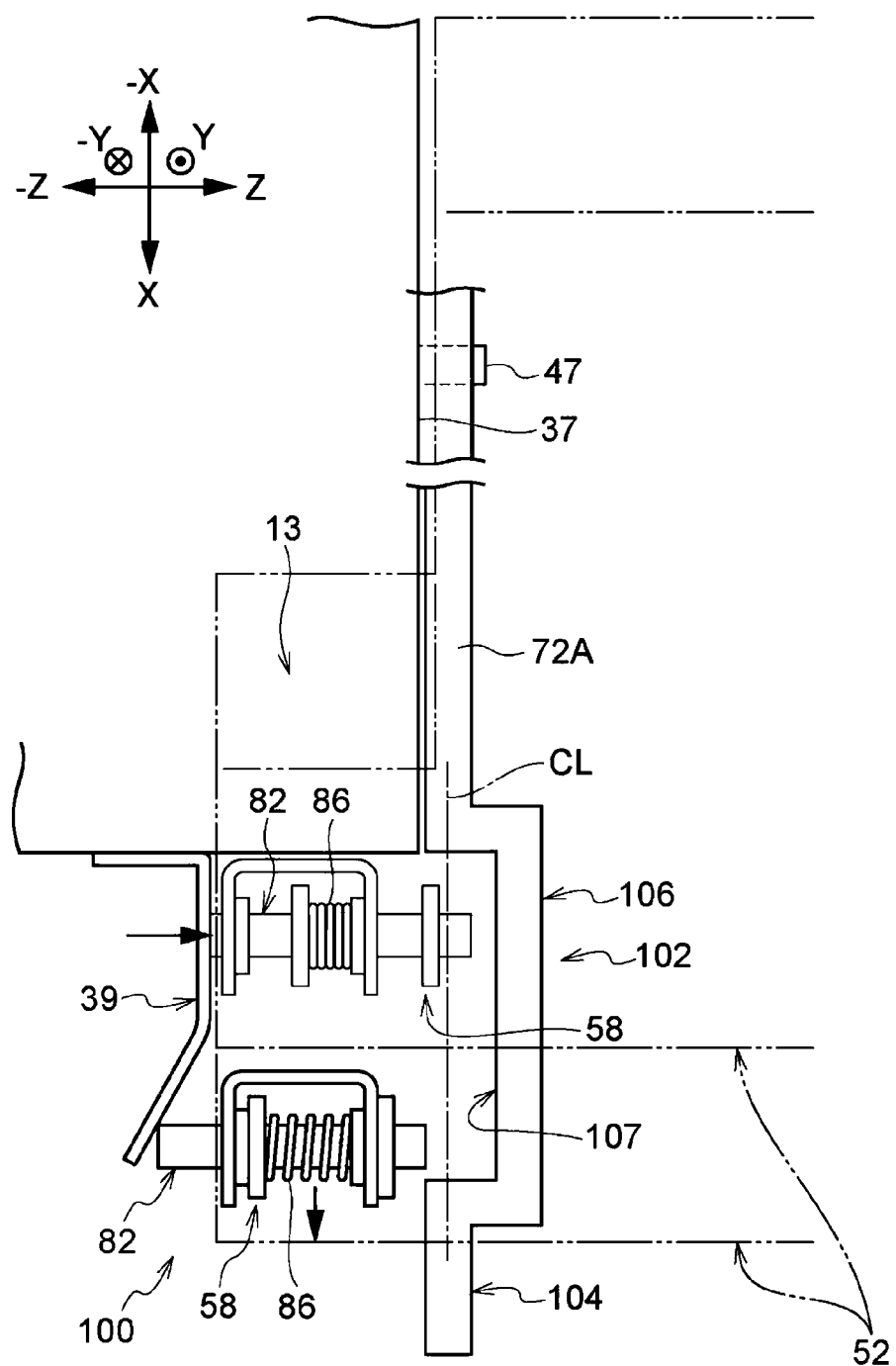
FIG. 9 illustrates a removable link member according to a second exemplary embodiment in the second position.

FIG. 9 illustrates a removable structure 100, which is an example of the assembly removable structure according to the second exemplary embodiment. The removable structure 100 is provided instead of the removable structure 50 (see FIG. 3) of the image forming apparatus 10 (see FIG. 1) according to the first exemplary embodiment. The removable structure 100 includes a fixing unit 52, a coupling member 54 (see FIG. 3), a link member 102, which is an example of a switch member, an operation lever 58, and a blocking portion 104, which is an example of a blocking device. FIG. 9 illustrates the operation lever 58 in the restriction position with a thin line, and the operation lever 58 in the release position with a thick line.

Link Member

For example, the link member 102 includes a first link member 106, disposed on the Z side of the side plate 37, and a second link member 74 (see FIG. 3), disposed on the −Z side of the side plate 37 and fixed to the first link member 106. The operation lever 58 is disposed on the outer side (−Z side) of the link member 102.

For example, instead of the sag portion 72C and the front plate portion 72D (see FIG. 3) of the first link member 72 (see FIG. 3) according to the first exemplary embodiment, the first link member 106 includes a retract portion 107 and a blocking portion 104. The lengthwise portion 72A and the upright portion 72B (see FIG. 3) remain unchanged in the present exemplary embodiment. The blocking portion 104 is described in detail below. The first link member 106 is supported by the support pin 46 (see FIG. 3) and the support pin 47 and movable in the X direction.

When the link member 102 is pulled out to the X side to be in the second position, the coupling member 54 (see FIG. 3) retracts away from the coupling member 65 (see FIG. 2B). When, on the other hand, the link member 102 is pushed to the −X side to be in the first position, the coupling member 54 is connected to the coupling member 65 to be in the projecting state.

The retract portion 107 is disposed on the X side of the long hole 72F (see FIG. 6) of the lengthwise portion 72A. The retract portion 107 is recessed to the Z side of the center line CL of the lengthwise portion 72A. In other words, the retract portion 107 has a space that is open to the −Z side. The retract portion 107 faces the bracket 39 and the operation lever 58 in the Z direction when the first link member 106 is in the second position. The retract portion 107 has a U-shape that is open to the −Z side when viewed in the Y direction.

The retract portion 107 has a size that allows the operation lever 58 to be movable (operable) to the Z side and the X side relative to the bracket 39 when the first link member 106 is in the second position. Specifically, the distance by which the retract portion 107 retracts in the Z direction is longer than the length of the shaft 82 in the Z direction by which the shaft 82 protrudes to the −Z side from the bracket 39 while the operation lever 58 is in the restricted state. The dimension of the retract portion 107 in the X direction is longer than the dimension of the operation lever 58 in the X direction. When the retract portion 107 is disposed on the Z side of the operation lever 58, the shaft 82 is allowed to be pulled out from the through hole 39C (see FIG. 3) to the Z side, and the operation lever 58 is allowed to be moved to the X side. In other words, when the link member 102 is in the second position, the operation lever 58 is movable to the release position from the restriction position.

The link member 102 is operated independently of the covering 12 (see FIG. 1). Operated independently here refers to the case where the link member 102 is not moved by the force for operating the covering 12 and the covering 12 is not moved when the link member 102 is operated.

Blocking Portion

Figure 10:
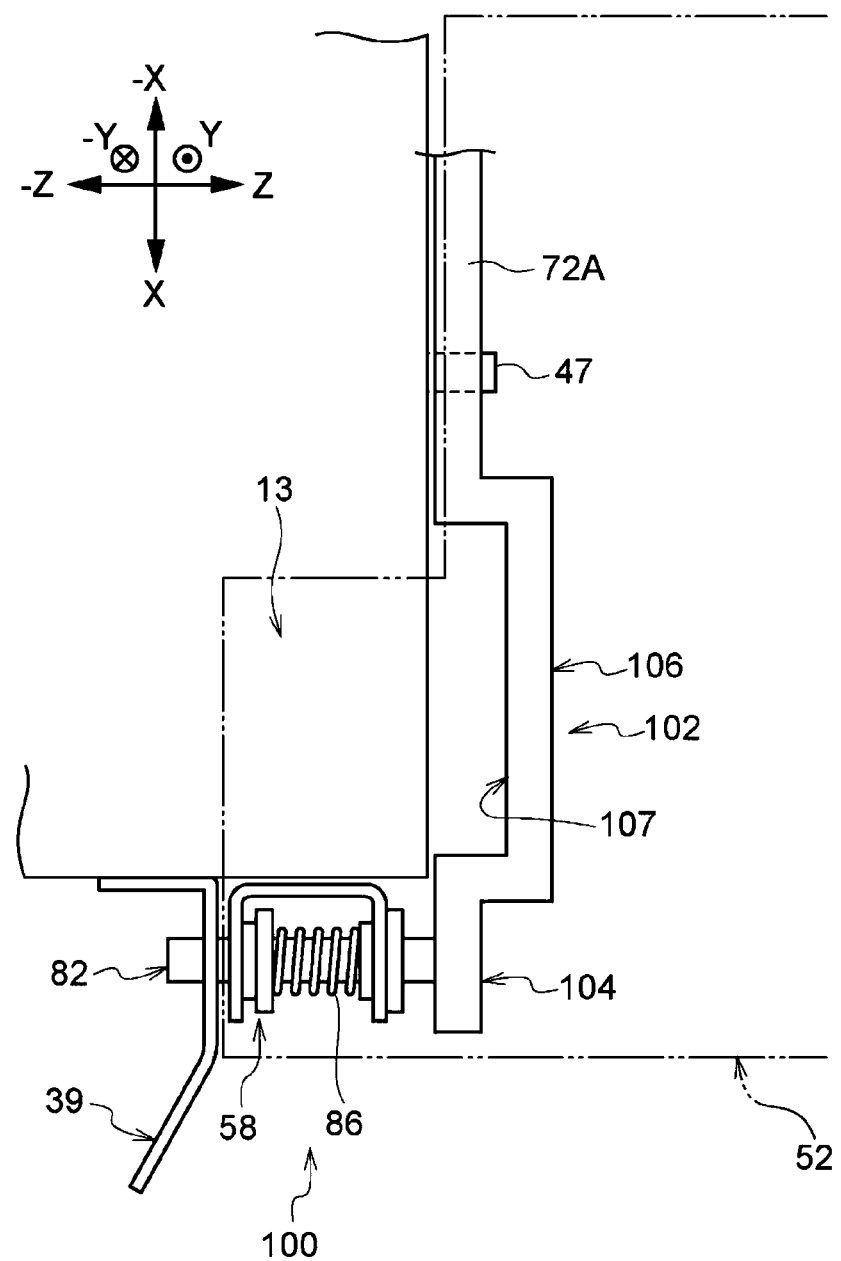
FIG. 10 illustrates the link member according to the second exemplary embodiment in the first position and interfering with the operation lever.

The blocking portion 104 illustrated in FIG. 10 is disposed, for example, on the link member 102 (first link member 106). Specifically, the blocking portion 104 has a shape of a plate having a thickness in the Z direction and extending from the X side end portion of the retract portion 107 to the X side. The blocking portion 104 is disposed on the Z side of the operation lever 58 when the fixing unit 52 is attached to the receiving member 13 and the link member 102 is in the first position.

The blocking portion 104 has such a dimension in the Y direction as to partially overlap the shaft 82 in the X direction when the blocking portion 104 is viewed in the Z direction. Specifically, the blocking portion 104 interferes with the shaft 82 of the operation lever 58 moving from the restriction position to the release position when the link member 102 is switched to the first position, to restrict movement (operation) of the operation lever 58 to the release position.

Operation

The operation of the second exemplary embodiment is described below.

In the removable structure 100 illustrated in FIG. 10, the fixing unit 52 is attached to the receiving member 13 when the link member 102 is in the second position. Here, the operation lever 58 is in the restriction position. When the link member 102 is switched from the second position to the first position, the coupling member 54 (see FIG. 3) is connected to the coupling member 65 (see FIG. 2B).

When the link member 102 is switched to the first position, the blocking portion 104 is disposed on the Z side of the shaft 82. Thus, the operation lever 58 is prevented from being moved in the Z direction by being interfered with the blocking portion 104. Specifically, the blocking portion 104 restricts the movement of the operation lever 58 to the release position. Thus, the fixing unit 52 is prevented from being removed from the receiving member 13 when the coupling members 54 and 65 (see FIG. 2B) are connected together. This structure prevents the coupling member 54 from being degraded (deformed such as having the shaft bent) unlike the structure in which the operation lever 58 is operable while the coupling members 54 and 65 are connected together.

In the removable structure 100, the blocking portion 104 interferes with the operation lever 58 when the operation lever 58 moves from the restriction position to the release position. The fixing unit 52 is thus kept in the restricted state. The fixing unit 52 is thus prevented from being removed from the receiving member 13 while the coupling members 54 and 65 are connected together.

In the removable structure 100, the blocking portion 104 is disposed on the link member 102. This structure eliminates the need for a mechanism for moving the blocking portion 104 separately from the link member 102. The blocking portion 104 thus has a simpler structure in this structure than in the structure where the blocking portion 104 and the link member 102 are separately disposed.

In the removable structure 100 of the image forming apparatus 10 (see FIG. 1), the coupling members 54 and 65 are prevented from being degraded. This structure thus further reduces variation of the rotation transmitted to the fixing roller 62 than the structure not including the removable structure 100. This structure thus prevents the fixed toner from being displaced from a predetermined fixed position on the sheet P and reduces defects of the toner image G.

Third Exemplary Embodiment

An assembly removable structure and an image forming apparatus according to a third exemplary embodiment are described now as examples. Components and portions basically the same as those of the first and second exemplary embodiments are denoted with the signs the same as those of the first and second exemplary embodiments and not described.

Figure 11:
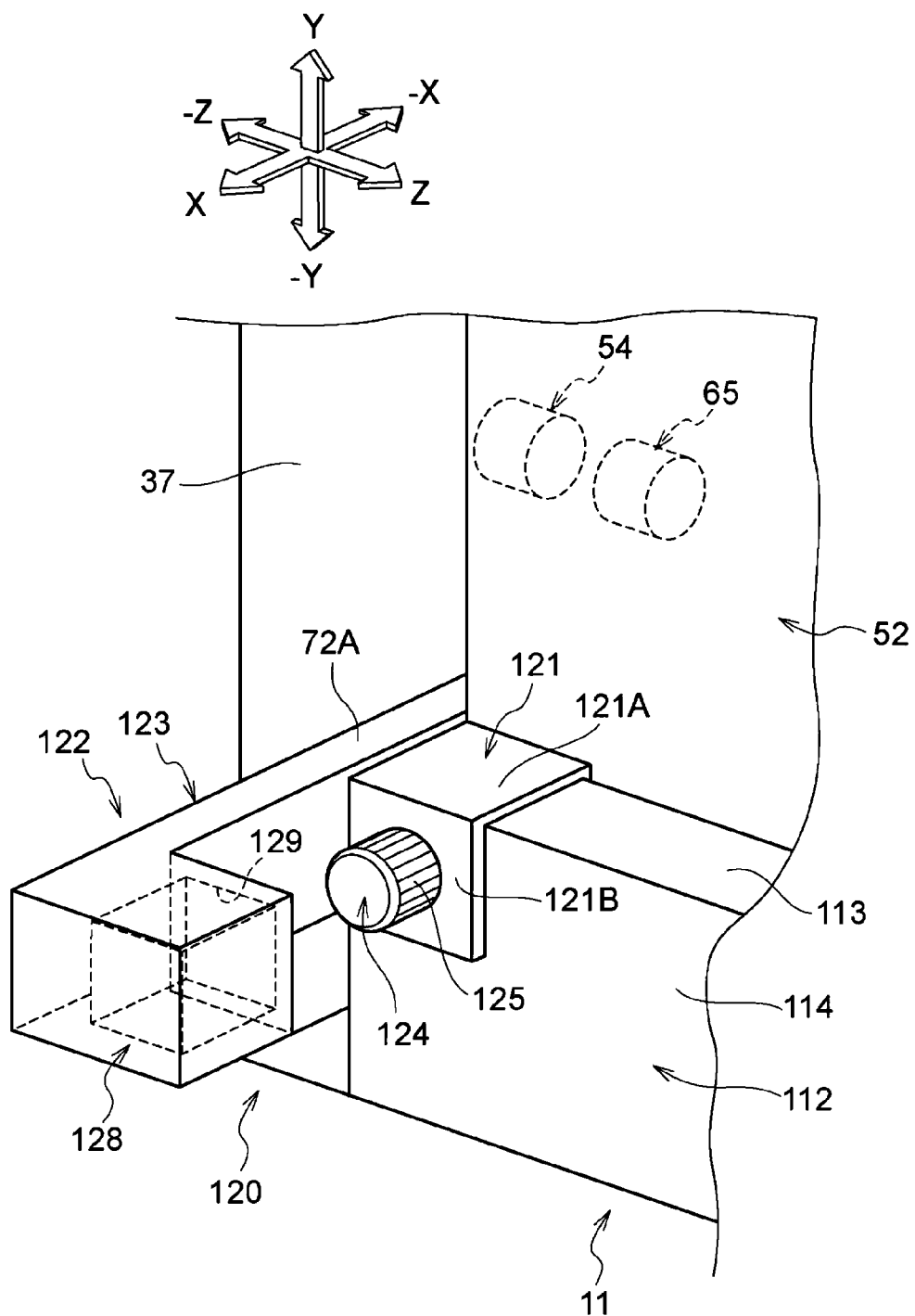
FIG. 11 illustrates a removable structure according to a third exemplary embodiment.

FIG. 11 illustrates a removable structure 120 of an assembly removable structure according to a third exemplary embodiment. The removable structure 120 is provided instead of the removable structure 50 (see FIG. 3) of the image forming apparatus 10 (see FIG. 1) according to the first exemplary embodiment. The removable structure 120 also includes a fixing unit 52, a coupling member 54, a link member 122, which is an example of a switch member, a thumb screw 124, which is an example of a restricting member, and a blocking portion 128, which is an example of a blocking device.

The image forming apparatus 10 according to the third exemplary embodiment including the removable structure 120 includes a receiving member 112 in the apparatus body 11, instead of the receiving member 13 (see FIG. 3). The receiving member 112 includes, for example, a bottom plate 113, extending in the X and Z directions, and a front plate 114, extending to the −Y side from the X side end portion of the bottom plate 113. The bottom plate 113 and the front plate 114 are supported by the side plate 37. The bottom plate 113 has a size capable of receiving the entirety of the fixing unit 52. The receiving member 112 includes a spring that presses the fixing unit 52 against the removal side. The spring is not illustrated. An internal thread 115 (see FIG. 12A) extending through the front plate 114 in the X direction is disposed at a corner portion forming the −Z side end portion and the Y side end portion of the front plate 114.

The fixing unit 52 according to the third exemplary embodiment includes a bracket 121. The bracket 121 is attached to the −Z side end portion and the X side end portion of the fixing unit 52 with a screw, not illustrated. The bracket 121 includes a plate portion 121A, extending in the X-Z plane, and a plate portion 121B, extending in the Y-Z plane to the −Y side from the X side end portion of the plate portion 121A. The plate portion 121B has a through hole 121C (see FIG. 12A) extending through in the X direction. The fixing unit 52 has its position fixed in the X direction as a result of the bracket 121 coming into contact with the front plate 114.

Link Member

The link member 122 includes, for example, a first link member 123, disposed on the Z side of the side plate 37, and a second link member 74 (see FIG. 3), disposed on the −Z side of the side plate 37 and fixed to the first link member 123.

The first link member 123 includes, for example, a lengthwise portion 72A, which is wider in the Y direction than that of the first link member 72 (see FIG. 3) according to the first exemplary embodiment, and a blocking portion 128 instead of the sag portion 72C and the front plate portion 72D (see FIG. 3). The upright portion 72B (see FIG. 3) remains the same. The blocking portion 128 is an example of a blocking device. The blocking portion 128 is described in detail below. The first link member 123 is supported by the support pins 46 and 47 (see FIG. 3) and movable in the X direction.

When the link member 122 is pulled out to the X side to be in the second position, the coupling member 54 retracts away from the coupling member 65. When, on the other hand, the link member 122 is pushed to the −X side to be in the first position, the coupling member 54 is connected to the coupling member 65 to be in a projecting state.

The link member 122 is operated independently of the covering 12 (see FIG. 1). Operated independently refers to the case where the link member 122 is not moved with the force for operating the covering 12 and that the covering 12 is not moved when the link member 122 is operated.

Thumb Screw

Figure 12A:
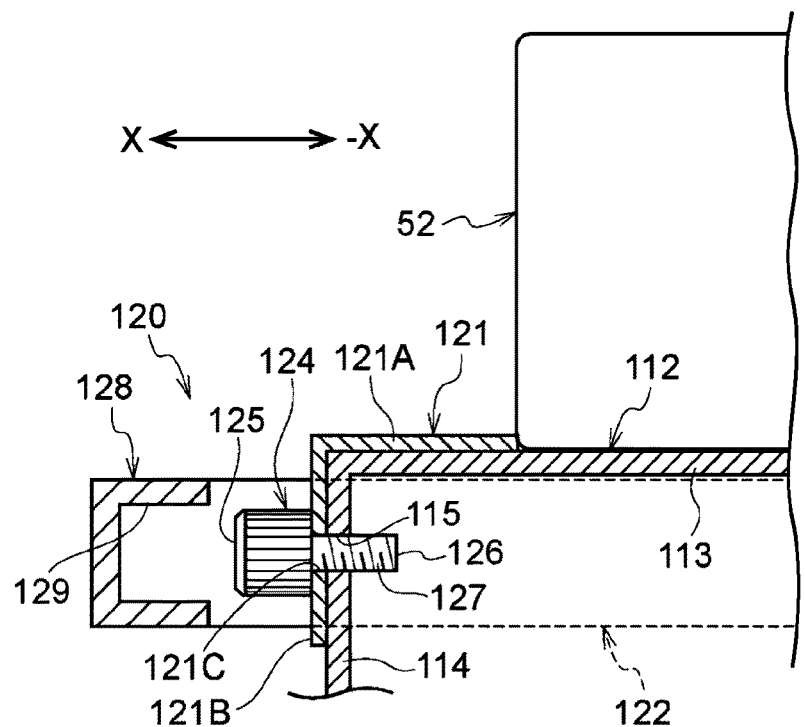
FIG. 12A illustrates a link member according to the third exemplary embodiment in the second position.

The thumb screw 124 illustrated in FIG. 12A includes a knob 125, having a cylindrical shape having an axis extending in the X direction, and a shaft portion 126, having a cylindrical shape having an axis extending in the X direction from the center of the knob 125. The shaft portion 126 has an outer diameter smaller than the outer diameter of the knob 125 and insertable into the through hole 121C. An external screw 127 is formed on the outer circumferential surface of the shaft portion 126. The external screw 127 is engageable with the internal thread 115 of the front plate 114. Specifically, the fixing unit 52 is prevented from being removed (the thumb screw 124 is disposed in the restriction position) as a result of the external screw 127 being engaged with the internal thread 115. In other words, the thumb screw 124 fixes the fixing unit 52 to the receiving member 112. The position of the thumb screw 124 at which the external screw 127 is not engaged with the internal thread 115 is the release position of the thumb screw 124.

Blocking Portion

The blocking portion 128 illustrated in FIG. 11 is disposed on the first link member 123. Specifically, for example, the blocking portion 128 has a rectangular parallelepiped shape protruding to the Z side from the X side end portion of the lengthwise portion 72A of the first link member 123. The blocking portion 128 has an angular-tube shape with a bottom when viewed from the −X side in the X direction. In other words, the blocking portion 128 has a recess 129, which is a space that opens to the −X side.

The recess 129 has a size capable of covering the entirety of the knob 125 of the thumb screw 124. Thus, the blocking portion 128 covers the knob 125 while being in contact with the plate portion 121B when the fixing unit 52 is attached to the receiving member 112, the thumb screw 124 restricts removal of the fixing unit 52, and the link member 122 is in the first position. Specifically, when the link member 122 is switched to the first position, the blocking portion 128 blocks the operation path of the thumb screw 124 to restrict the operation of the thumb screw 124 to the release position.

The operation path according to the present exemplary embodiment refers to the path along which an operator's finger, not illustrated, travels until reaching the knob 125. In the present exemplary embodiment, blocking the operation path refers to disposing a component constituting the blocking portion 128 to the X side (closer to the operator, not illustrated) of the knob 125. In other words, blocking the operation path refers to disabling an operator, not illustrated, from operating the thumb screw 124 from the restriction position to the release position.

Operation

The operation of the third exemplary embodiment is described below.

As illustrated in FIG. 12A, in the removable structure 120, when the link member 122 is in the second position, the fixing unit 52 is attached to the receiving member 112. When the external screw 127 of the thumb screw 124 passes through the through hole 121C of the bracket 121 and is engaged with the internal thread 115 of the front plate 114, the fixing unit 52 is prevented from being removed.

Figure 12B:
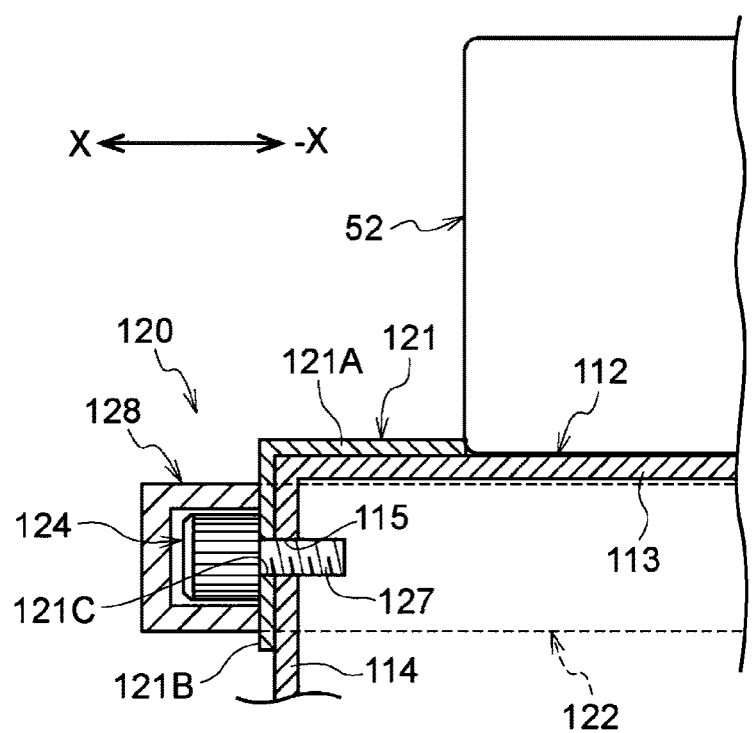
FIG. 12B illustrates the link member according to the third exemplary embodiment in the first position.

Subsequently, as illustrated in FIG. 12B, when the link member 122 is switched from the second position to the first position, the coupling member 54 (see FIG. 11) is connected to the coupling member 65 (see FIG. 11). When the link member 122 is switched to the first position, the blocking portion 128 covers the thumb screw 124. The blocking portion 128 thus restricts movement of the thumb screw 124 performed by an operator, not illustrated. The fixing unit 52 is thus prevented from being removed from the receiving member 13 while the coupling members 54 and 65 are connected together. This structure thus prevents the coupling member 54 from being degraded (deformed such as having the shaft bent) unlike the structure in which the thumb screw 124 is operable while the coupling members 54 and 65 are connected together.

In the removable structure 120, the blocking portion 128 restricts the operation of the thumb screw 124 by blocking the operation path of the thumb screw 124. This structure renders the thumb screw 124 less recognizable by an operator. This structure thus prevents the thumb screw 124 from being mishandled unlike the structure in which the thumb screw 124 is operable to the release position while the coupling members 54 and 65 are connected together.

In the removable structure 120, the blocking portion 128 is disposed on the link member 122. This structure eliminates the need for a mechanism for moving the blocking portion 128 separately from the link member 122. The blocking portion 128 thus has a simpler structure in this structure than in the structure where the blocking portion 128 and the link member 122 are separately disposed.

In the image forming apparatus 10, the coupling members 54 and 65 are prevented from being degraded. This structure thus further reduces variation of the rotation transmitted to the fixing roller 62 (see FIG. 2B) than the structure not including the removable structure 120. This structure thus prevents the fixed toner from being displaced from a predetermined fixed position on the sheet P and reduces defects of the toner image G.

Fourth Exemplary Embodiment

Now, an assembly removable structure and an image forming apparatus according to a fourth exemplary embodiment are described as an example. Components and portions basically the same as those of the first, second, and third exemplary embodiments are denoted by the reference signs the same as those of the first, second, and third exemplary embodiments and not described.

Figure 13:
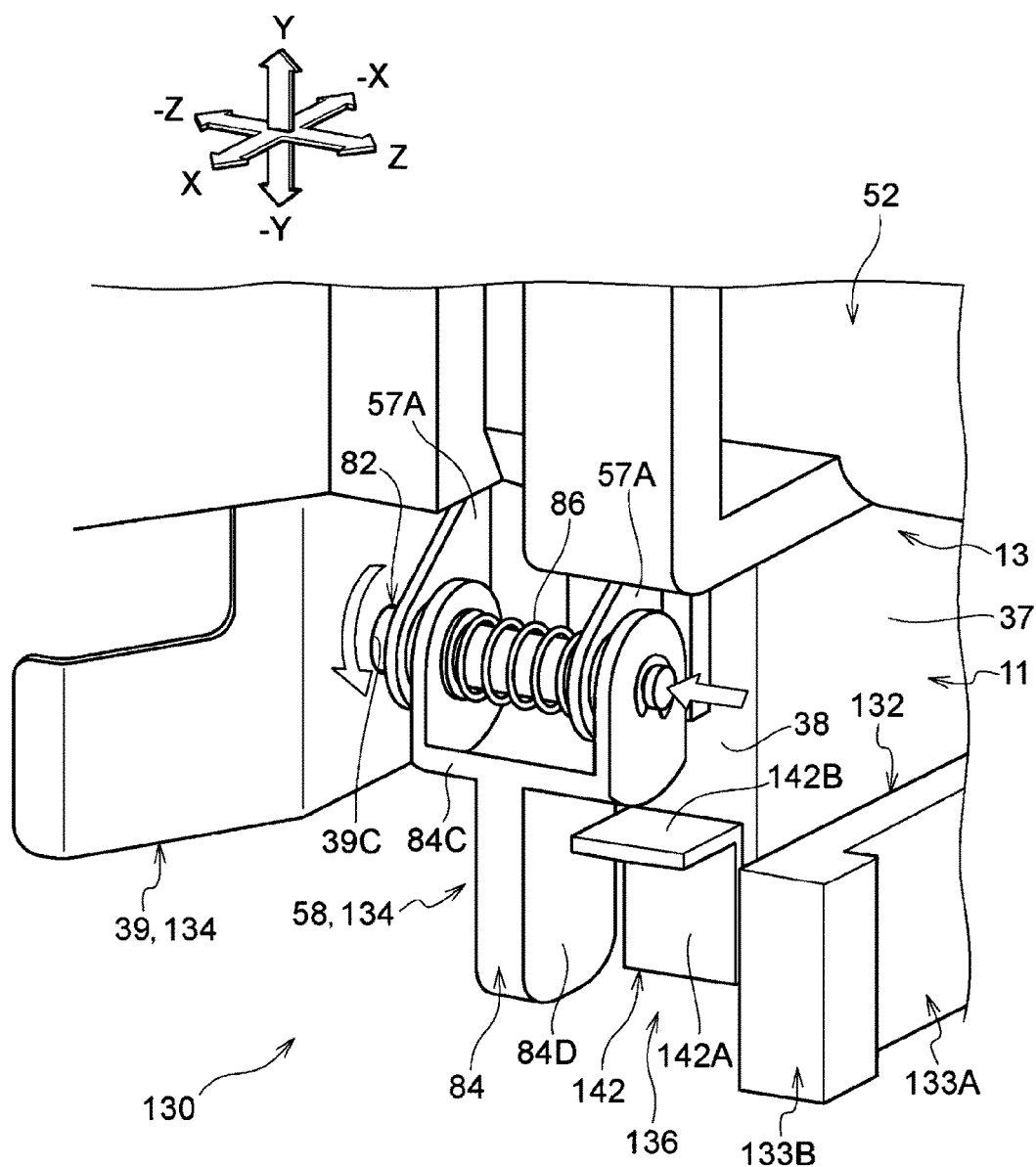
FIG. 13 illustrates a removable structure according to a fourth exemplary embodiment.

FIG. 13 illustrates a removable structure 130, which is an example of an assembly removable structure according to a fourth exemplary embodiment. The removable structure 130 is provided instead of the removable structure 100 (see FIG. 9) of the image forming apparatus 10 (see FIG. 1) according to the second exemplary embodiment. The removable structure 130 includes a fixing unit 52, a coupling member 54 (see FIG. 3), a link member 132, which is an example of a switch member, a restricting member 134, and a blocking portion 136, which is an example of a blocking device.

Link Member

The link member 132 includes, for example, a plate portion 133A and a tab 133B, instead of the retract portion 107 and the blocking portion 104 (see FIG. 9) of the first link member 106 (see FIG. 9) constituting part of the link member 102 according to the second exemplary embodiment.

When the link member 132 is pulled out to the X side to be in the second position, the coupling member 54 (see FIG. 3) retracts away from the coupling member 65 (see FIG. 2B). When, on the other hand, the link member 132 is pushed to the −X side to be in the first position, the coupling member 54 is connected to the coupling member 65 to be in the projecting state.

The plate portion 133A is a plate-shaped component disposed at the X side end portion of the lengthwise portion 72A (see FIG. 6) and extending to the X side in the X direction while having a thickness in the Z direction. When viewed in the X direction, the plate portion 133A is disposed further to the Z side (the side away from the side plate 37) of the side plate 37 than the lengthwise portion 72A. The plate portion 133A does not interfere with the operation lever 58 moved to the restriction position and the release position.

The tab 133B is a portion extending to the Z side from the X side end portion of the plate portion 133A. The tab 133B does not interfere with the operation lever 58 moved to the restriction position and the release position. The operation lever 58 is disposed on the outer side (−Z side) of the link member 132.

The link member 132 is operated independently of the covering 12 (see FIG. 1). Operated independently here refers to the case where the link member 132 is not moved by the force for operating the covering 12 and the covering 12 is not moved when the link member 132 is operated.

Restricting Member

The restricting member 134 includes an operation lever 58, which is an example of an operation member, and a bracket 39, which is an example of an insertable member. As described above, the operation lever 58 includes a shaft 82 and an operation portion 84. As described above, the bracket 39 is disposed on the apparatus body 11 and restricts movement of the shaft 82 in the X direction with the shaft 82 inserted into the through hole 39C.

Blocking Portion

The blocking portion 136 includes, for example, a fastening member 142 fixed to the front plate 38 of the apparatus body 11.

The fastening member 142 includes a wall 142A, overlapping the front plate 38 from the X side and fixed to the front plate 38 with a screw, not illustrated, and an overhanging portion 142B, extending to the X side from the wall 142A from the Y side end portion of the wall 142A. When viewed in the X direction, the wall 142A has a rectangular plate shape having a thickness in the X direction, a length in the Y direction, and a width in the Z direction. The overhanging portion 142B has a rectangular plate shape having a thickness in the Y direction, a length in the Z direction, and a width in the X direction when viewed in the Y direction.

Figure 14A:
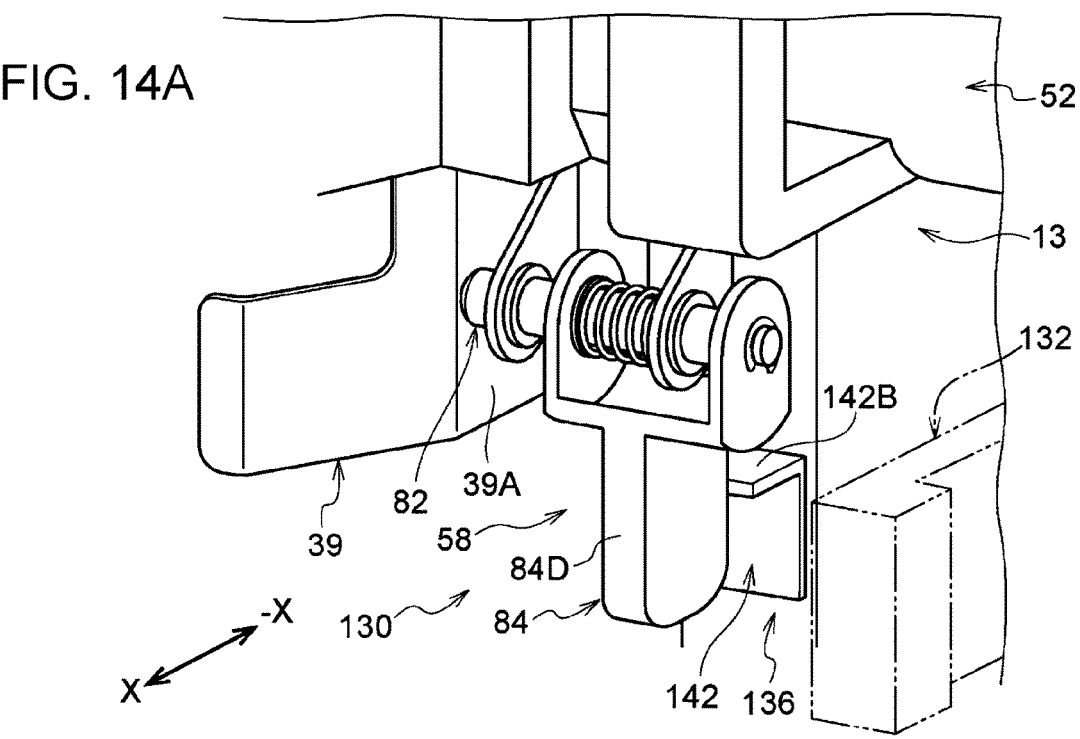
FIG. 14A illustrates an operation lever according to the fourth exemplary embodiment not in contact with a fastening member.

FIG. 14A illustrates the shaft 82 having the −Z side end portion in contact with the wall 39A of the bracket 39 before the fixing unit 52 is attached to the receiving member 13. Here, the fastening member 142 is disposed so that part of the −X side end surface of the lever portion 84D is in contact with the X side end surface of the overhanging portion 142B in the X direction. In other words, when the shaft 82 is not inserted into the through hole 39C of the bracket 39 (see FIG. 13), the operation portion 84 is rotated about the center axis, not illustrated, of the shaft 82 while being in contact with the fastening member 142.

As described above, the operation lever 58 comes into contact with the fastening member 142 in the X direction. The rotation of the operation portion 84 enables relative movement of the fastening member 142 to the −X side. When the operation lever 58 moves to the −X side and the through hole 39C and the shaft 82 are aligned in the Z direction, the shaft 82 is allowed to be inserted into the through hole 39C of the bracket 39. After inserted into the through hole 39C, the operation lever 58 rotates with its weight to extend in the Y direction.

As illustrated in FIG. 13, the fastening member 142 is disposed on the Z side and −Y side of the operation lever 58 when the fixing unit 52 is attached to the receiving member 13, the link member 132 is disposed at the first position, and the operation lever 58 is disposed at the restriction position. Specifically, when the operation lever 58 is disposed at the restriction position, the wall 142A is disposed at the Z side and the −X side of the lever portion 84D, and the overhanging portion 142B is disposed on the Z side of the lever portion 84D and −Y side of the bridge portion 84C.

When the operation lever 58 is disposed at the restriction position, the distance between the lever portion 84D and the overhanging portion 142B in the Z direction is smaller than or equal to the length of the shaft 82 protruding to the −Z side from the side plate 57A on the −Z side. Specifically, the fastening member 142 restricts the operation of the operation lever 58 to the release position by interfering with the operation portion 84 of the operation lever 58 moving from the restriction position to the release position. The position of the operation lever 58 at which the operation lever 58 interferes with the fastening member 142 after moving to the Z side is referred to as an interference position. In the present exemplary embodiment, the interference position is, for example, disposed on the Z side of the restriction position of the operation lever 58.

As described above, while the fixing unit 52 is attached to the receiving member 13, the operation lever 58 comes into contact with the fastening member 142 and is moved from the release position to the restriction position. The lever portion 84D of the operation lever 58 moved to the restriction position is aligned with the fastening member 142 in the Z direction and interferes with the fastening member 142 while being moved (operated) from the restriction position to the release position. When the operation portion 84 is rotated about the shaft 82 while the operation lever 58 is in the restriction position, the lever portion 84D becomes misaligned with the fastening member 142 in the Z direction, and the movement (operation) from the restriction position to the release position is enabled.

Operation

Subsequently, the operations of the fourth exemplary embodiment are described.

Figure 14B:
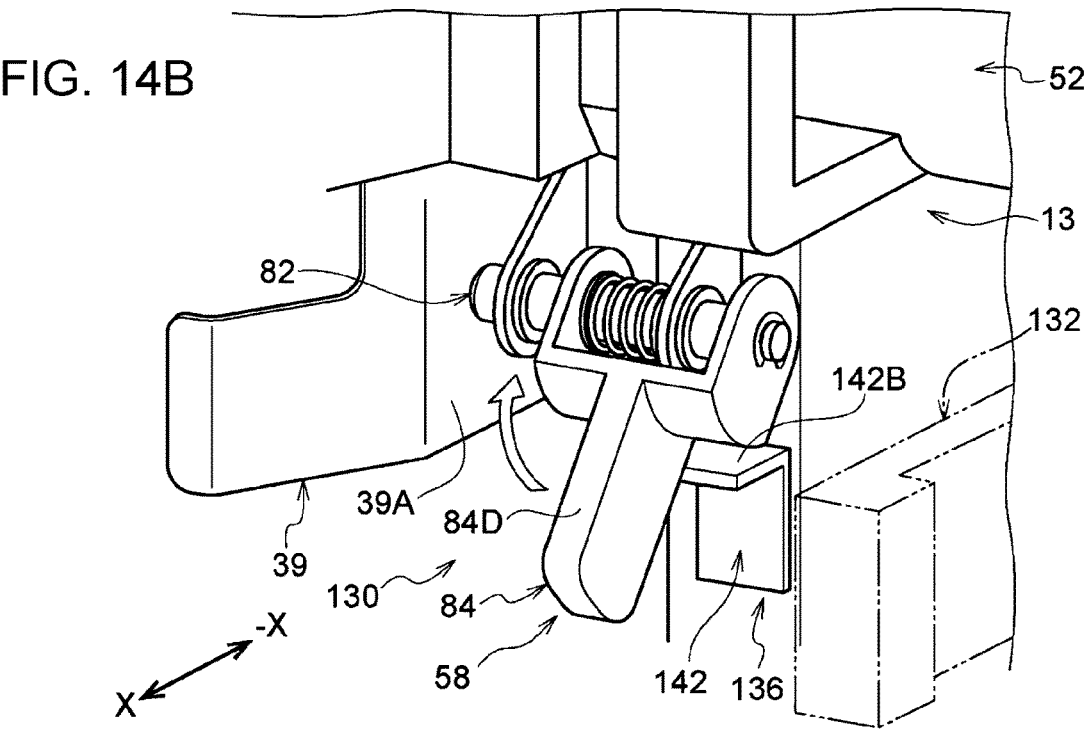
FIG. 14B illustrates the operation lever according to the fourth exemplary embodiment in contact with the fastening member.

In the removable structure 130 illustrated in FIG. 14A, while the link member 132 is in the second position, the fixing unit 52 is attached to the receiving member 13. Here, the operation portion 84 touches the fastening member 142 at the X side. As illustrated in FIG. 14B, the shaft 82 is thus rotated about a center axis, not illustrated, and the operation lever 58 becomes movable to the −X side relative to the fastening member 142.

Subsequently, as illustrated in FIG. 13, when the through hole 39C and the shaft 82 are aligned in the Z direction, the shaft 82 is inserted into the through hole 39C with the pressing force of the coil spring 86. At this time, the operation lever 58 is rotated by its weight to extend in the Y direction. Thus, the operation lever 58 is disposed at a position (the restriction position) to the −Z side of the fastening member 142. In other words, when the operation lever 58 arrives at the restriction position, the operation lever 58 becomes separated from the fastening member 142, and the position of the fastening member 142 on the path along which the operation lever 58 moves to the release position changes. When the link member 132 is switched from the second position to the first position, the coupling member 54 (see FIG. 3) is connected to the coupling member 65 (see FIG. 2B).

When the link member 132 is switched to the first position, the blocking portion 136 (fastening member 142) is disposed on the Z side of the operation portion 84. The movement of the operation lever 58 in the Z direction is thus restricted by the interference of the blocking portion 136 and the operation portion 84. The fixing unit 52 is unremovable from the receiving member 13 while the coupling members 54 and 65 (see FIG. 2B) are connected together. This structure prevents the coupling member 54 from being degraded (deformed such as having the shaft bent) unlike the structure in which the operation lever 58 is operable while the coupling members 54 and 65 are connected together.

In the removable structure 130, the operation lever 58 is moved from the release position to the restriction position in response to the attachment of the fixing unit 52 to the receiving member 13. Specifically, the operation lever 58 rotates as a result of coming into contact with the fastening member 142 and moves to the restriction position. The operation lever 58 is disposed on the −Z side of the fastening member 142 and allowed to interfere with the fastening member 142 in the Z direction. The operation lever 58 is thus automatically disposed on the restriction position in response to an attachment of the fixing unit 52 to the receiving member 13. The structure in which the blocking portion 136 serves as the fastening member 142 eliminates the need for an operation for moving the operation lever 58 to the restriction position.

In the removable structure 130, when the operation lever 58 in the restriction position is to be released, the lever portion 84D (operation portion 84) of the operation lever 58 is rotated to the X side. Thus, the lever portion 84D and the fastening member 142 become misaligned with each other in the Z direction. Here, the shaft 82 is pulled out from the through hole 39C to the Z side when the lever portion 84D is picked up and moved to the Z side. When the fixing unit 52 is moved to the X side in this state, the fixing unit 52 is removed from the receiving member 13.

A comparative example in which the operation portion 84 does not rotate needs a mechanism for moving the fastening member 142 to move the operation lever 58 to the release position.

In the removable structure 130, the operation lever 58 is movable with a simple rotation of the lever portion 84D. This structure enables movement of the operation lever 58 to a position at which it interferes with the fastening member 142 with a simpler operation than the structure in which the operation portion 84 does not rotate.

In the removable structure 130 of the image forming apparatus 10 (see FIG. 1), the coupling members 54 and 65 are prevented from being degraded. This structure thus further reduces variation of the rotation transmitted to the fixing roller 62 than the structure not including the removable structure 130. This structure thus prevents the fixed toner from being displaced from a predetermined fixed position on the sheet P and reduces defects of the toner image G.

The present invention is not limited to the above-described exemplary embodiments.

Modification Example

Figure 15:
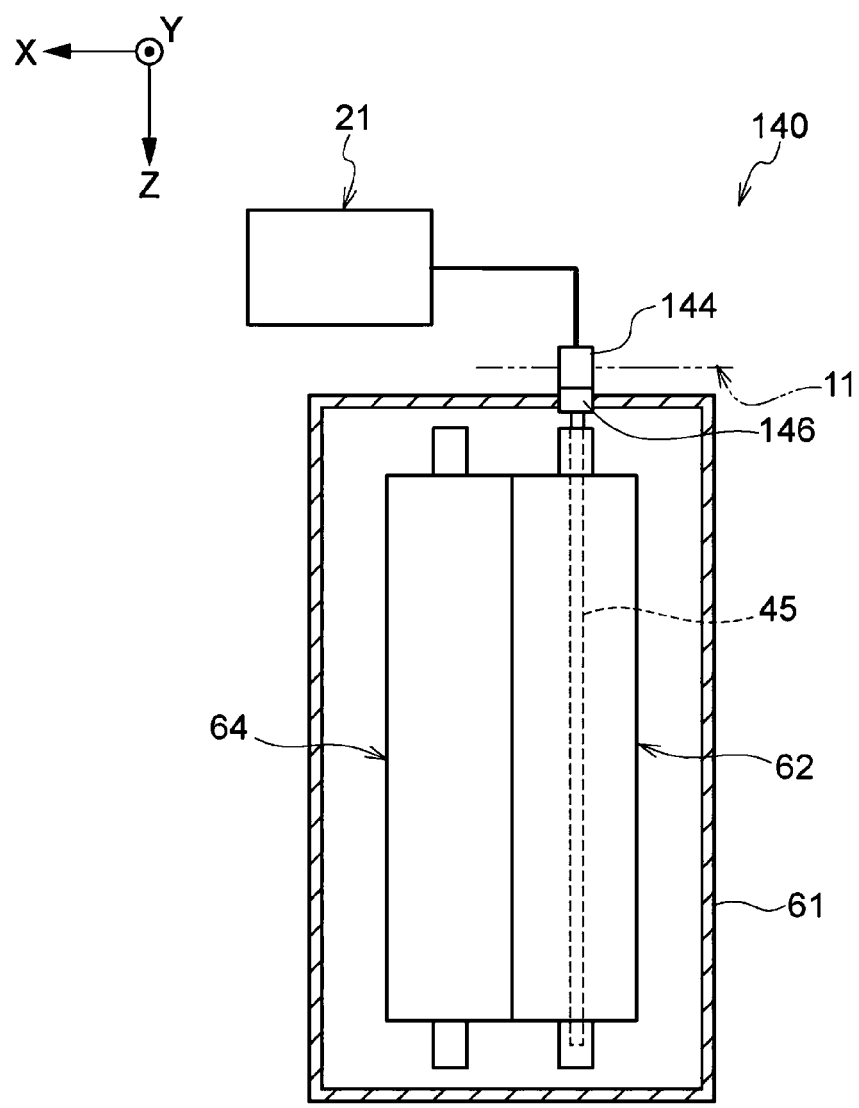
FIG. 15 illustrates an internal structure of a fixing unit according to a modification example.

FIG. 15 illustrates part of an image forming apparatus 140 according to a modification example. The image forming apparatus 140 includes a connector 144, which is an example of a connection member, and a connector 146, which is an example of a connectable member, instead of the coupling members 54 and 65 (see FIG. 2B) in the removable structure 50 (see FIG. 1) of the image forming apparatus 10. Components and portions other than the connectors 144 and 146 are the same as those of the image forming apparatus 10 and the removable structure 50. The driver 26 (see FIG. 1) rotates the fixing roller 62 using gears, not illustrated.

The connectors 144 and 146 each include multiple terminals, not illustrated, and are capable of being energized while being connected together. The connector 144 is movable toward and away from the apparatus body 11 in the Z direction. The connector 146 is disposed on the fixing unit 52. A power supply 21 energizes the connector 144. A halogen heater 45 is an example of a heat generator. The halogen heater 45 generates heat when energized by the power supply 21 through the connectors 144 and 146 to fix a toner image G (see FIG. 1) to a sheet P.

The image forming apparatus 140 prevents connection portions (terminals) of the connectors 144 and 146 from being degraded with the effects the same as those of the removable structure 50 according to the first exemplary embodiment. This structure further reduces variation of power fed to the halogen heater 45 than the structure not including the removable structure 50. This structure thus prevents a reduction of the amount of heat fed to the toner fixed to the sheet P compared to the predetermined amount of heat, and thus reduces defects (such as a cold-offset) of the toner image G.

Other Modification Example

In the removable structure 50, the blocking portion 90 may be disposed separately from the link member 56. For example, a blocking device may be provided by disposing a movement member that moves in the Z direction on the apparatus body 11, and moving the movement member to the X side of the operation lever 58 and the link member 56 after the link member 56 is switched to the first position. In the removable structure 50, the operation lever 58 may be disposed on the inner side of the link member 56 in the Z direction. The removable structure 50 may exclude a coil spring 86. In the removable structure 50, the blocking portion 90 interferes with the operation lever 58 to disable rotation of the operation lever 58 and movement of the operation lever 58 to the release position. The blocking portion 90 is thus an example of an interfering device. The operation lever 58 may be moved from the release position to the restriction position by an operator. These removable structures 50 according to the modification example may include connectors 144 and 146 instead of the coupling members 54 and 65. The removable structures 50 may exclude a coil spring 86.

In the removable structure 100, the blocking portion 104 may be disposed separately from the link member 102. For example, the apparatus body 11 may house a plate movable in the X direction, and the plate may be pulled out to interfere with the shaft 82 after the fixing unit 52 is attached to the receiving member 13. The removable structure 100 according to the exemplary embodiment and the removable structure 100 according to a modification example may include connectors 144 and 146 instead of the coupling members 54 and 65. The removable structure 100 may exclude the coil spring 86.

In the removable structure 120, the blocking portion 128 may be disposed separately from the link member 122. For example, a blocking device may be provided by disposing a movement member that moves in the Z direction on the apparatus body 11, and moving the movement member to the X side of the thumb screw 124 after the link member 122 is switched to the first position. When the fixing unit 52 is removed from the receiving member 13, the thumb screw 124 may be kept being held by the fixing unit 52 (bracket 121) or removed from the fixing unit 52. Alternatively, a blocking device (interfering device) may be disposed on the X side of the thumb screw 124 to interfere with the thumb screw 124 when the thumb screw 124 is operated. The removable structures 120 according to the exemplary embodiment and the modification examples may include connectors 144 and 146 instead of the coupling members 54 and 65.

In the removable structure 130, the operation lever 58 may include only the shaft 82. The fastening member 142 may include a guide surface (for example, an inclined surface) that guides the Z side end portion of the shaft 82 to the restriction position. The shaft 82 may be moved to the restriction position with a contact between the guide surface and the Z side end portion of the shaft 82. In the removable structure 130, the restriction position and the interference position of the operation lever 58 may be displaced from each other in the Z direction. The removable structure 130 may exclude the coil spring 86 when the operation lever 58 is manually moved to the restriction position. In addition, the removable structures 130 according to the exemplary embodiment and the modification example may include connectors 144 and 146 instead of the coupling members 54 and 65.

The assembly is not limited to the fixing unit 52 and may be, for example, the image forming unit 25, the transfer unit 27, or a unit for correcting bends of the sheets P.

A blocking device may be either a fixed member or a movable member. A blocking device formed of a movable member may be movable alone or integrally with other members. A restricting member and a blocking device may be disposed at the center of the assembly in the longitudinal direction instead of at one or the other end of the assembly in the longitudinal direction.

The fixing unit 52 may be attached and removed in the Z direction or the Y direction instead of the X direction. The direction in which a restricting device is operated may be a direction the same as or crossing the direction in which the fixing unit 52 is attached or removed.

A rotator may be, instead of the fixing roller 62, a fixing belt or a transfer roller of a transfer unit.

Instead of the thumb screw 124, the restricting member may include, for example, a screw tightened by a driver.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An assembly removable structure, comprising:
   an assembly that includes a connectable member and that is attached to and removed from a receiving member of an apparatus body in a first direction;
   a connection member disposed on the apparatus body to be movable forward and backward in a cross direction that crosses the first direction, the connection member allowing the connectable member to be connected thereto while being in a projecting state;
   a switch member that is operated independently of a lid member and that switches the connection member between a first position, in which the connection member allows the connectable member to be connected thereto, and a second position, in which the connection member allows the connectable member to be removed therefrom, the lid member rendering the receiving member open and closed;
   a restricting member that moves with an operation from a restriction position, at which the restricting member restricts the assembly from being removed from the receiving member, to a release position, at which the restricting member releases the assembly; and
   a blocking device that restricts an operation of moving the restricting member to the release position when the switch member is switched to the first position.

2. The assembly removable structure according to claim 1, wherein the blocking device restricts an operation of moving the restricting member to the release position by blocking an operation path of the restricting member.

3. The assembly removable structure according to claim 2, wherein the blocking device is disposed on the switch member.

4. The assembly removable structure according to claim 1, wherein the blocking device restricts an operation of moving the restricting member to the release position by interfering with the restricting member moving to the release position.

5. The assembly removable structure according to claim 4,
- wherein the blocking device is a fastening member fixed to the apparatus body, and
- wherein, when the assembly is attached to the receiving member, the restricting member comes into contact with the fastening member and moves from the release position to the restriction position, and, while moving from the restriction position to the release position, the restricting member interferes with the fastening member.

6. The assembly removable structure according to claim 5,
- wherein the restricting member includes
  - an operation member that is disposed on the assembly, and includes a shaft portion, movable in an axial direction crossing the first direction, and an operation portion, disposed on the shaft portion to be operated, and
  - an insertable member that is disposed on the apparatus body and, when allowing the shaft portion to be inserted thereinto, restricts movement of the shaft portion,
- wherein, the operation member moves from the release position to the restriction position when the operation portion comes into contact with the fastening member while the shaft portion is not inserted into the insertable member, the operation portion is aligned with the fastening member in the axial direction when the operation portion is in the restriction position, the operation portion interferes with the fastening member when the operation portion is moved from the restriction position to the release position, and the operation portion is allowed to move from the restriction position to the release position when the operation portion in the restriction position is rotated about the shaft portion.

7. An image forming apparatus that forms an image on a recording medium, the image forming apparatus comprising the assembly removable structure according to claim 1,
- wherein each of the connection member and the connectable member is rotatable about an axis extending in the cross direction,
- wherein the apparatus body includes a driver that drives the connection member to rotate, and
- wherein the assembly includes a rotator that rotates with a rotational force transmitted from the driver via the connection member and the connectable member.

8. An image forming apparatus that forms an image on a recording medium, the image forming apparatus comprising the assembly removable structure according to claim 1,
- wherein the connection member and the connectable member are capable of being energized while being connected together,
- wherein the apparatus body includes a power supply that energizes the connection member and the connectable member, and
- wherein the assembly includes a heat generator that generates heat when energized by the power supply via the connection member and the connectable member, and that fixes an image to the recording medium.

* * * * *